US009092487B1

(12) United States Patent
Cope

(10) Patent No.: US 9,092,487 B1
(45) Date of Patent: *Jul. 28, 2015

(54) ANALYZING CONTENT USING ABSTRACTABLE INTERCHANGEABLE ELEMENTS

(71) Applicant: OpenLogic, Inc., Broomfield, CO (US)

(72) Inventor: Rod Cope, Broomfield, CO (US)

(73) Assignee: OpenLogic, Inc., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/954,639

(22) Filed: Jul. 30, 2013

Related U.S. Application Data

(63) Continuation of application No. 12/831,775, filed on Jul. 7, 2010, now Pat. No. 8,498,982.

(51) Int. Cl.
  *G06F 17/30* (2006.01)
(52) U.S. Cl.
  CPC ................................ *G06F 17/30522* (2013.01)
(58) Field of Classification Search
  CPC ................... G06F 17/30864; G06F 17/30867; G06F 17/30991
  USPC ............ 707/706, 722, 708, 711, 748; 705/59
  See application file for complete search history.

(56) References Cited

U.S. PATENT DOCUMENTS

| 5,553,282 | A | 9/1996 | Parrish et al. |
| 5,765,152 | A | 6/1998 | Erickson |
| 5,860,012 | A | 1/1999 | Luu |
| 5,892,900 | A | 4/1999 | Ginter et al. |
| 5,974,521 | A | 10/1999 | Akerib |
| 5,983,218 | A | 11/1999 | Syeda-Mahmood |
| 6,110,229 | A | 8/2000 | Yamaguchi |

(Continued)

OTHER PUBLICATIONS

Berglund, Erik, et al., "Open-Source Documentation: In Search of User-Driven, Just-in-time Writing," SIGDOC'01, Oct. 21-24, 2001, Santa Fe, New Mexico, USA, ACM 1-58113-295-6/01/0010, p. 132-141.

(Continued)

*Primary Examiner* — Mariela Reyes
*Assistant Examiner* — Thong Vu
(74) *Attorney, Agent, or Firm* — Marsh Fischmann & Breyfogle LLP

(57) ABSTRACT

A system and method (a "utility") is provided for improving the accuracy of a content matching analysis that identifies a composition of an item of protectable content of a user. The item of protectable content may include a portion of source code or object code, individual or bundled source code or object code files, binary code files, directory structures and/or trees, open source software projects or packages, and/or proprietary software applications or packages. The utility involves storing a number of items of comparison content on a storage structure, receiving an item of user content at a computer-based content exchange, and comparing the item of user content to the items of comparison content to determine, from among the items of comparison content, one or more potential matches that each include a matched portion that is similar to a portion of the item of user content. The utility further includes selecting a noise reduction technique from a number of noise reduction techniques available to the content exchange and applying the noise reduction technique to eliminate noise and/or false positives (e.g., one or more redundant matches and/or erroneously identified matches) from the potential matches.

32 Claims, 17 Drawing Sheets

(56) References Cited

U.S. PATENT DOCUMENTS

| | | |
|---|---|---|
| 6,493,709 B1 | 12/2002 | Aiken |
| 6,895,581 B1 | 5/2005 | Chkodrov et al. |
| 7,139,811 B2 | 11/2006 | Lev Ran et al. |
| 7,185,344 B2 | 2/2007 | Grover et al. |
| 7,188,118 B2 | 3/2007 | Borthakur et al. |
| 7,233,940 B2 | 6/2007 | Bamberger et al. |
| 7,246,156 B2 | 7/2007 | Ginter et al. |
| 7,296,011 B2 | 11/2007 | Chaudhuri et al. |
| 7,353,224 B2 | 4/2008 | Chen et al. |
| 7,418,491 B2 | 8/2008 | Childress et al. |
| 7,458,062 B2 | 11/2008 | Coulthard et al. |
| 7,539,478 B2 * | 5/2009 | Herley et al. ............... 455/345 |
| 7,552,093 B2 | 6/2009 | Levin et al. |
| 7,565,348 B1 | 7/2009 | Waldin et al. |
| 7,631,294 B2 | 12/2009 | Rush et al. |
| 7,657,866 B2 | 2/2010 | Cope et al. |
| 7,661,089 B2 | 2/2010 | Cope et al. |
| 7,665,086 B2 | 2/2010 | Cope et al. |
| 7,669,199 B2 | 2/2010 | Cope et al. |
| 8,010,511 B2 | 8/2011 | Brock et al. |
| 8,103,675 B2 | 1/2012 | Zhou et al. |
| 8,180,735 B2 | 5/2012 | Ansari et al. |
| 2002/0035451 A1 | 3/2002 | Rothermel |
| 2002/0040469 A1 | 4/2002 | Pramberger |
| 2002/0049738 A1 | 4/2002 | Epstein |
| 2002/0144255 A1 | 10/2002 | Anderson |
| 2002/0174010 A1 | 11/2002 | Rice, III |
| 2002/0198846 A1 | 12/2002 | Lao |
| 2003/0009740 A1 | 1/2003 | Lan |
| 2003/0051226 A1 | 3/2003 | Zimmer et al. |
| 2003/0084425 A1 | 5/2003 | Glaser |
| 2003/0135842 A1 | 7/2003 | Frey et al. |
| 2003/0192029 A1 | 10/2003 | Hughes |
| 2004/0054566 A1 | 3/2004 | J'Maev |
| 2004/0073789 A1 | 4/2004 | Powers |
| 2004/0244008 A1 | 12/2004 | Lee |
| 2005/0086030 A1 | 4/2005 | Zeidman |
| 2005/0114683 A1 | 5/2005 | Jin et al. |
| 2005/0125358 A1 | 6/2005 | Levin et al. |
| 2005/0183021 A1 | 8/2005 | Allen et al. |
| 2005/0188345 A1 | 8/2005 | Chang et al. |
| 2006/0116966 A1 * | 6/2006 | Pedersen et al. ............... 705/59 |
| 2006/0212464 A1 | 9/2006 | Pedersen |
| 2006/0282465 A1 | 12/2006 | Sharma |
| 2007/0260651 A1 | 11/2007 | Pedersen |
| 2007/0288438 A1 | 12/2007 | Epstein |
| 2007/0299825 A1 | 12/2007 | Rush et al. |
| 2008/0091677 A1 | 4/2008 | Pedersen et al. |
| 2008/0091938 A1 | 4/2008 | Pedersen et al. |
| 2008/0154965 A1 | 6/2008 | Pedersen |
| 2009/0125445 A1 | 5/2009 | Mousavi et al. |
| 2009/0177635 A1 | 7/2009 | Koohgoli et al. |
| 2009/0234852 A1 | 9/2009 | Mola |
| 2009/0259633 A1 | 10/2009 | Bronstein et al. |
| 2009/0281995 A1 | 11/2009 | Mousavi et al. |
| 2010/0121866 A1 | 5/2010 | Bell et al. |
| 2010/0149384 A1 | 6/2010 | Iijima et al. |
| 2010/0306260 A1 | 12/2010 | Dejean |
| 2011/0301447 A1 | 12/2011 | Park et al. |
| 2013/0080447 A1 * | 3/2013 | Ramer et al. ............... 707/748 |
| 2013/0132367 A1 * | 5/2013 | King et al. ............... 707/711 |
| 2013/0290290 A1 * | 10/2013 | Bain ............... 707/706 |
| 2013/0346385 A1 * | 12/2013 | Kraftsow et al. ............. 707/708 |

OTHER PUBLICATIONS

Feller, Joseph, et al., "A Framework Analysis of the Open Source Development Paradigm," Analysis of OSS Development, p. 1-11, 2000, International Conference on Information Systems.

Freericks, Carla, "Open Source Standards on Software Process: A Practical Application," Standards and Innovation in Telecommunications and Information Technology, IEEE Communications Magazine, 0163-6804/01, Apr. 2001,p. 116-123.

Scacchi, Walt, "Strategies for Developing and Deploying Free/Open Source Software" Institute for Software Research, University of California, Irvine, http://www.ics.uci.edu/~wscacchi/Presentations/OSS-Strategies/, p. 1-19, Apr. 26, 2004, Presentations/OSS-Strategies/Strategies-Developing-Deploying-FOSS.ppt.

Fitzgerald, Brian, et al., "Developing an Information Systems Infrastructure with Open Source Software," focus developing with open source software, IEEE Software, 0740-7459/04/2004 IEEE, p. 50-55.

Frishberg, Nancy, Ph.D., et al., "Getting to Know You: Open Source Development Meets Usability," CHI 2002, changing the world, changing ourselves, Apr. 20-25, 2002, Minneapolis, Minnesota, USA, ACM 1-58113-454-1/02/0004.

SourceForge.net is the world's largest Open Source software development website, Apr. 23, 2003, pp. 1-3, http://web.archive.org/web/20030423010024/http://sourceforge.net.

Norris, Jeffrey S., Mission-Critical Development with Open Source Software: Lessons Learned, Focus Developing with Open Source Software, IEEE Software, Jan./Feb. 2004, p. 42-49.

Spinellis, Diomidis, et al., "How Is Open Source Affecting Software Development?" Focus Guest Editors' Introduction, IEEE Software, Jan./Feb. 2004, p. 28-F3.

Froehlich, Jon, et al., "Unifying Artifacts and Activities in a Visual Tool for Distributed Software Development Teams," Proceedings of the 26th International Conference on Software Engineering (ICSE'04) 0270-5257/04.

Shankland, Stephen, MySQL Addresses Open-Source License Problem, Mar. 12, 2004, http://news.cnet.com/2100-7344_3-5173014.html, p. 1 of 4.

Lerner, Josh, et al. "Some Simple Economics of Open Source," Wily-Blackwell, The Journal of Industrial Economics, vol. 50, No. 2 (Jun. 2002), pp. 197-234, Blackwell Publishing, http://www.jstor.org/stable/3569837.

Schmitz, Patrice-Emmunuel, "Pooling Open Source Software," an IDA Feasibility Study Interchange of Data between Administrations, p. 1 of 147, Jun. 2002.

Pizka, Markus, "Adaptation of Large-Scale Open source Software—An Experience Report"), Proceedings of the Eighth European Conference on Software Maintenance and Reengineering (CSMR'04) 1534-5351/04 IEEE.

Hars, Alexander, et al., Working for Free?—Motivations of Participating in Open Source Projects, Proceedings of the 34th Hawaii International Conference on System Sciences—2001, 0-7695-0981-9/01 IEEE, p. 1-9.

* cited by examiner

FIG. 11

ANALYZING CONTENT USING ABSTRACTABLE INTERCHANGEABLE ELEMENTS

CROSS-REFERENCE TO RELATED APPLICATION

This application is a continuation of U.S. patent application Ser. No. 12/831,775, entitled: "NOISE REDUCTION FOR CONTENT MATCHING ANALYSIS FOR PROTECTABLE CONTENT" filed on Jul. 7, 2010. The contents of the above application are incorporated by reference herein as if set forth in full.

FIELD OF THE INVENTION

This invention generally relates to determining a composition of an item of protectable content such as computer code. For example, the invention relates to tools for scanning computer code to detect portions of open source or proprietary code that may be present in the code under analysis based on code matching. More particularly, the present invention relates to improving the accuracy of a set of match results that represents a composition of an item of protectable content.

BACKGROUND OF THE INVENTION

Many organizational users of protectable content (e.g., open source software code, proprietary software code, freeware) are concerned with identifying the composition of the protectable content included in their code libraries as well as the license provisions associated with that protectable content. Understanding the components of a user's protectable content helps the user determine whether the user's protectable content and/or particular usages of that protectable content are in compliance with all applicable software license provisions and/or the user's associated use policies. For example, a user may seek to identify whether a snippet or portion of open source code has inadvertently or intentionally been introduced into an item of protectable content within the user's code library and whether the introduced code renders the user's protectable content noncompliant with applicable license provisions and/or the user's protectable content use policies.

To determine the composition of an item of protectable content, some have proposed a partially automated discovery process that involves analyzing the item of protectable content for snippets or segments of code that are similar to or that "match" snippets or segments of code contained within known open source or proprietary content that has been assembled within a library of existing content for comparison ("comparison content"). After a comparison between the user's protectable content and the comparison content is complete, the user receives a list of match results that identifies all or substantially all of the items of comparison content that were found to contain snippets of code that match snippets of code from the user's item of protectable content. This process is generally known as deep discovery, deep dive, deep source scanning, or content matching (hereinafter "deep discovery" or "content matching").

While content matching is useful in determining the composition of a user's protectable content, current deep discovery techniques exhibit several deficiencies, including unacceptable levels of noise in the match results. More specifically, the nature of the open source software concept encourages software developers to access and make use of existing open source software code when developing new open source software code. As a result, items of protectable content (e.g., portions or snippets of code, code files, directory structures and/or trees, open source software projects and packages, and proprietary software applications) often exist as part of a complex network of interdependencies and interrelationships. Conventional content matching analysis methods lack the ability to differentiate between an original source of a snippet of code and various other items of comparison content that contain the snippet of code but that are merely related to the original source, and are therefore duplicative or redundant. As a result, conventional content matching analysis techniques generally produce match results that include "false positives," or that identify inaccurate or erroneous, redundant, and/or unnecessary matches from among the items of comparison content. The user must then review the match results to determine which of the match results represent original sources of the copied snippets, which are incorrectly identified, and which are correctly identified but are redundant and/or duplicative. This manual process of elimination is time consuming and generally requires extensive knowledge of the interrelationships between the various items of comparison content identified in the match results.

Other deficiencies in current content matching analysis methods include inefficiencies in the process of performing content matching analysis, including unreasonably lengthy analysis times, an inability to customize and/or optimize deep discovery analyses, difficulty identifying all matches, especially when interchangeable and/or nonfunctional elements have been removed or altered for the purpose of the content matching analysis, and difficulty securing or protecting the confidentiality of the user's protectable content during the course of a content matching analysis.

SUMMARY OF THE INVENTION

The present invention involves a system and method (a "utility") for accurately performing a content matching analysis to determine a composition of an item of protectable content such as a portion of source code or object code, individual or bundled source code or object code files, binary code files, directory structures and/or trees, open source software projects or packages, and/or proprietary software applications or packages. In this regard, the inventors have recognized that users often need to understand the various components that form an item of protectable content such as, for instance, a piece of newly developed software. For example, prior to releasing, commercializing, or commencing use of a newly developed piece of software or a product that contains a newly developed piece of software, on a periodic basis, or in connection with transactions, compliance reviews, or other triggering events, a developing entity may wish to know whether existing software elements have been incorporated into the newly developed software code, and if so, an identification of those existing software elements. Further, the developing entity may wish to know what license terms, restrictions, and/or obligations apply to the newly developed piece of software as a result of its incorporation of one or more pieces of existing licensed software. This information is important because the license terms, restrictions, and/or obligations that apply to the newly developed piece of software may have a significant impact on the manner in which the piece of software can be used. For instance, if the newly developed source code incorporates a snippet or portion of code taken from an existing piece of software that is subject to a so-called "copyleft" license provision, the developing entity may, in some cases, be obligated to grant permission to reproduce, adapt, or distribute that software code. If the newly developed piece of software is intended for a commercial product, the developing entity may want to avoid being subject to this type of license obligation.

Beyond recognizing the need to determine a composition of an item of protectable content, the inventors have recognized that conventional utilities for determining a composition of an item of protectable content, or conventional content matching, generally produce match results that have substantial noise. That is, while conventional content matching systems are able to analyze an item of protectable content received from a user (an "item of user content") and to some extent determine "what is in" that item of user content from among numerous items of protectable content maintained within a centralized database ("items of comparison content"), conventional match results often include an unacceptable amount of noise or false positives. Such noise and/or false positives include, for example, redundancies in the match results and/or match results that are inaccurate and/or erroneous and do not represent actual matches.

Thus, the inventors have devised a content matching utility for accurately identifying a composition of an item of user content. That is, the present invention includes a utility for determining a set of match results that more accurately represents the composition of the item of user content and that includes far fewer redundancies and inaccuracies than can be achieved using conventional matching systems and/or methods.

In particular, a first aspect of the present invention includes a utility for reducing noise in the match results of a content matching analysis. The utility initially involves storing a number of items of comparison content in a memory structure and providing, on a computer-based content exchange, instructions regarding numerous noise reduction techniques. The computer-based content exchange may be any appropriate computer processor or processors that are maintained independently or within a grid or cloud computing environment such that the content exchange may be dynamically scaled as necessary to complete the content matching analysis. The utility continues with comparing the item of user content to the items of comparison content and determining, from among the items of comparison content, an identity of one or more potential matches that each include a matched portion that is similar to a portion of the item of user content. To refine the potential matches and eliminate noise from the potential matches, the utility further involves selecting one of the noise reduction techniques available to the content exchange for application to the potential matches and applying the selected noise reduction technique to eliminate noise from the potential matches.

The items of comparison content and the item of user content may include any appropriate items of protectable content such as, for instance, one or more portions of source code, one or more portions of binary code, one or more source code files or binary code files, and/or one or more directory structures, software projects, software applications, or software packages. Moreover, the items of comparison content may include items of open source content and/or items of proprietary software content.

In addition, the noise and/or false positives may include, for example, redundant ones of the potential matches that merely duplicate content included in other potential matches. The noise and/or false positives may also include incorrectly or erroneously identified potential matches that do not, in fact, include a matched portion that is similar to a portion of the item of user content.

To progressively eliminate false positives as the content matching analysis continues, the steps of selecting and applying the noise reduction technique to eliminate false positives and/or noise from the potential matches may be iteratively repeated. This iterative repetition may occur over a defined time-period or it may continue for a defined number of iterations. In another implementation, the selecting and applying steps may iterate until the potential matches have been sufficiently reduced in that they include a set of confirmed matches that have been positively identified.

In one implementation, the utility further comprises obtaining providence information relating to the items of comparison content and applying the providence information in conjunction with the selected noise reduction technique or techniques to assist in eliminating false positives from the potential matches. The providence information may be any appropriate information relating to a web or network of interrelationships and interdependencies between the items of comparison content. For example, the providence information may relate to dependencies between one or more of the items of comparison content, versions of the items of comparison content, plug-ins between the items of comparison content, and/or parent projects and child projects of the items of comparison content.

There are numerous noise reduction techniques available to the computer-based content exchange. In this regard, the content exchange may automatically apply any one or more of the techniques as appropriate, or alternatively, the user may direct the selection of the noise reduction techniques for application. Further, the noise reduction techniques may be applied iteratively as the content matching analysis progresses.

In one embodiment, applying the selected noise reduction technique may involve using the providence information to determine whether the matched portion contained within the potential matches is native or canonical to any of the potential matches and eliminating the potential matches to which the matched portion is foreign, or redundant. In this regard, the providence information is instrumental in determining which of the potential matches is an original source of the matched portion and which of the potential matches are redundant sources of the matched portion such that the redundant or duplicate sources may be eliminated.

In another embodiment, applying the selected noise reduction technique may involve analyzing naming patterns associated with the items of comparison content, including the potential matches. Using the naming patterns and the providence information, the computer-based content exchange may be operated to determine how the potential matches for the matched portion interrelate. For example, the providence information and naming patterns may be applied to identify a first tier potential match and one or more second tier potential matches, where the second tier potential matches are nested within the first tier potential match. When all of the items of comparison content nested within the first tier potential match are included in the potential matches, the second tier potential matches may be eliminated as redundant, and when all of the second tier potential matches form only a portion of the items of comparison content nested within the first tier potential match, the first tier potential match may be eliminated as redundant.

In yet another implementation, applying the selected noise reduction technique may involve weighting the providence information according to a level of usage associated with each of the items of comparison content and then applying the weighted providence information to the potential matches such that the potential matches are biased toward a center of the network of interrelationships and interdependencies associated with the items of comparison content. The potential matches that remain substantially removed from or outside the center of the network may be eliminated or considered to be less likely matches.

Applying the selected noise reduction technique may also involve independently determining an identification of one or more license types that apply to the item of user content submitted for the matching analysis. Then, the providence information may be applied to identify associations between the license types and the potential matches such that any potential matches that lack an association with any of the license types may be eliminated or deemed less likely.

In an additional embodiment, applying the selected noise reduction technique may include adaptively adjusting a threshold size of the matched portion (e.g. size of a code window) so as to adaptively adjust a size of the portion that must coexist in the item of user content and one of the items of comparison content for the item of comparison content to be characterized as a potential match. The threshold size may be defined in any appropriate manner including, for example, by a number of lines of software code. The threshold size may be iteratively adjusted over a defined period of time or for a defined number of iterations. Moreover, the adaptive adjustment may be automated and/or the user may manually adjust the threshold as desired.

In a further implementation, applying the selected noise reduction technique may involve examining content (e.g., code text, directory structure) associated with the item of user content and/or one of the potential matches for a recitation of a name that is associated with the potential match. When the name of the potential match is not recited in either of the content of the item of user content or the content of the potential match, the potential match may be deemed less likely to be a match and eliminated. The names associated with the potential matches may be, for example, file names, project names, package names, and/or license types.

In another embodiment, applying the selected noise reduction technique may involve layering one or more noise reduction techniques with one or more conventional content matching techniques. That is, applying the noise reduction technique may involve first applying one or more of the noise reduction techniques discussed above to eliminate one or more of the potential matches. Then, one or more conventional matching techniques may be applied to any remaining potential matches to further reduce the potential matches. The conventional content matching techniques may include, for example, a comparison of file names, project names, package names, directory structures, and the like for each of the remaining potential matches to determine whether each of the potential matches is internally consistent or internally inconsistent. The potential matches that are internally inconsistent may be eliminated or deemed less likely to be matches.

Applying the selected noise reduction technique may also involve comparing the matched portion of one or more of the potential matches with the portion of the item of user content. That is, applying the selected noise reduction technique may involve directly comparing any matching code and/or directory structures that have been identified in one or more of the potential matches with a corresponding portion of the item of user content. In some implementations, this comparison may be completed manually by the user and may be carried out on a user network behind a user's firewall so as to protect the confidentiality of the source code associated with the item of user content.

To optimize the content matching process, the steps of comparing the item of user content to the items of comparison content, determining an identity of one or more potential matches, selecting one of the available noise reduction techniques, and applying the selected technique may be controlled via a number of adjustable system controls. The system controls may be adjusted manually or the content matching system may automatically optimize the controls prior to beginning or during the content matching analysis. Exemplary adjustable system controls include a size of the matching threshold, an optimal number of potential matches, a number of noise reduction techniques to apply, and the like.

To leverage the knowledge that the content matching system obtains with each content matching analysis, the utility may further comprise retaining information relating to choices made in connection with the steps of comparing the item of user content to the items of comparison content, determining an identity of one or more potential matches, selecting one of the available noise reduction techniques, and applying the selected noise reduction technique. This retained information may then be used to inform or direct subsequent repetitions of the comparing, determining, selecting, and applying steps so as to continuously improve content matching and noise reduction performance.

In one embodiment, the content matching utility may incorporate a user policy that governs use of protectable content. In this regard, the utility goes beyond determining an accurate composition of an item of user content and may be used to classify the item of user content with respect to the policy (e.g., compliant, noncompliant, conditionally compliant). That is, the utility may further include storing license information and package information associated with the items of comparison content in the memory structure and obtaining use information associated with the item of user content as well as information about a policy of a user regarding use of protectable content. The license information may identify one or more license provisions regarding one of a license type, license restrictions, and license obligations, and the use information may identify a use and/or a user (e.g., an individual or a group) of the item of user content. The package information may identify package names, package versions, release dates, and so on. The policy may define use parameters (e.g., allowable and/or intended uses for the item of user content) and user parameters for items of user content. Using the policy, the license information and/or the package information, and the use information, the computer-based content exchange may be operated to classify the item of user content in relation to the policy. The classifications may include first, second, and/or third categories that signify compliance with the policy, noncompliance with the policy, and conditional compliance with the policy if certain obligations and/or restrictions are met, respectively.

In yet another implementation, the utility may further include repeating the comparing, determining, selecting, and applying steps with respect to the same item of user content after the content matching system has undergone one or more enhancements. Such enhancements may include receipt of additional information or system improvements that may generally result in an improved content matching analysis for the item of user content. For example, additional matching techniques and/or additional noise reduction techniques may have been made available to the system such that repeating the content matching analysis with respect to the item of user content is likely to result in different or better matches.

Another aspect of the present invention provides a utility for improving accuracy in a set of content matching results. The utility involves establishing a computer-based content exchange that receives an item of user content and compares the item of user content to a library of items of comparison content to identify a number of potential matches from among the items of comparison content, where each of the potential matches includes a matched portion that is similar to a portion of the item of user content. The utility also includes selecting (manually or automatically) one or more noise reduction protocols from among numerous noise reduction protocols that are stored on the content exchange and applying the selected noise reduction protocols to the potential matches to eliminate false positives (e.g., redundancies and/or inaccuracies) from the potential matches. Depending on an outcome of the selecting and the applying steps, the utility may include iteratively repeating the selecting and the applying steps to eliminate an acceptable number of false positives, or until an acceptable amount of noise is eliminated from the potential matches. In one embodiment, an acceptable amount of noise is deemed to have been eliminated from the potential matches when the potential matches include at least one or more positively identified confirmed matches.

Yet another aspect of the present invention provides a utility for analyzing protectable content that includes one or more memory structures for storing a library of items of comparison content, a scanner for receiving an item of user content from a user, and a processor. The processor is communicatively coupled with the memory structures and the scanner and directs a comparison between the item of user content and the items of comparison content to identify a number of potential matches from among the items of comparison content. Each of the potential matches includes a matched portion that is similar to a portion of the item of user content, and the processor iteratively applies a number of noise reduction protocols to the potential matches to eliminate individual ones of the potential matches.

BRIEF DESCRIPTION OF THE DRAWINGS

For a more complete understanding of the present invention and further advantages thereof, reference is now made to the following Detailed Description taken in conjunction with the accompanying drawings, wherein:

FIG. 11 is a screenshot illustrating the web-based user interface of FIG. 10, wherein a files tab of the interface is active.

DETAILED DESCRIPTION OF THE INVENTION

Figure 1:
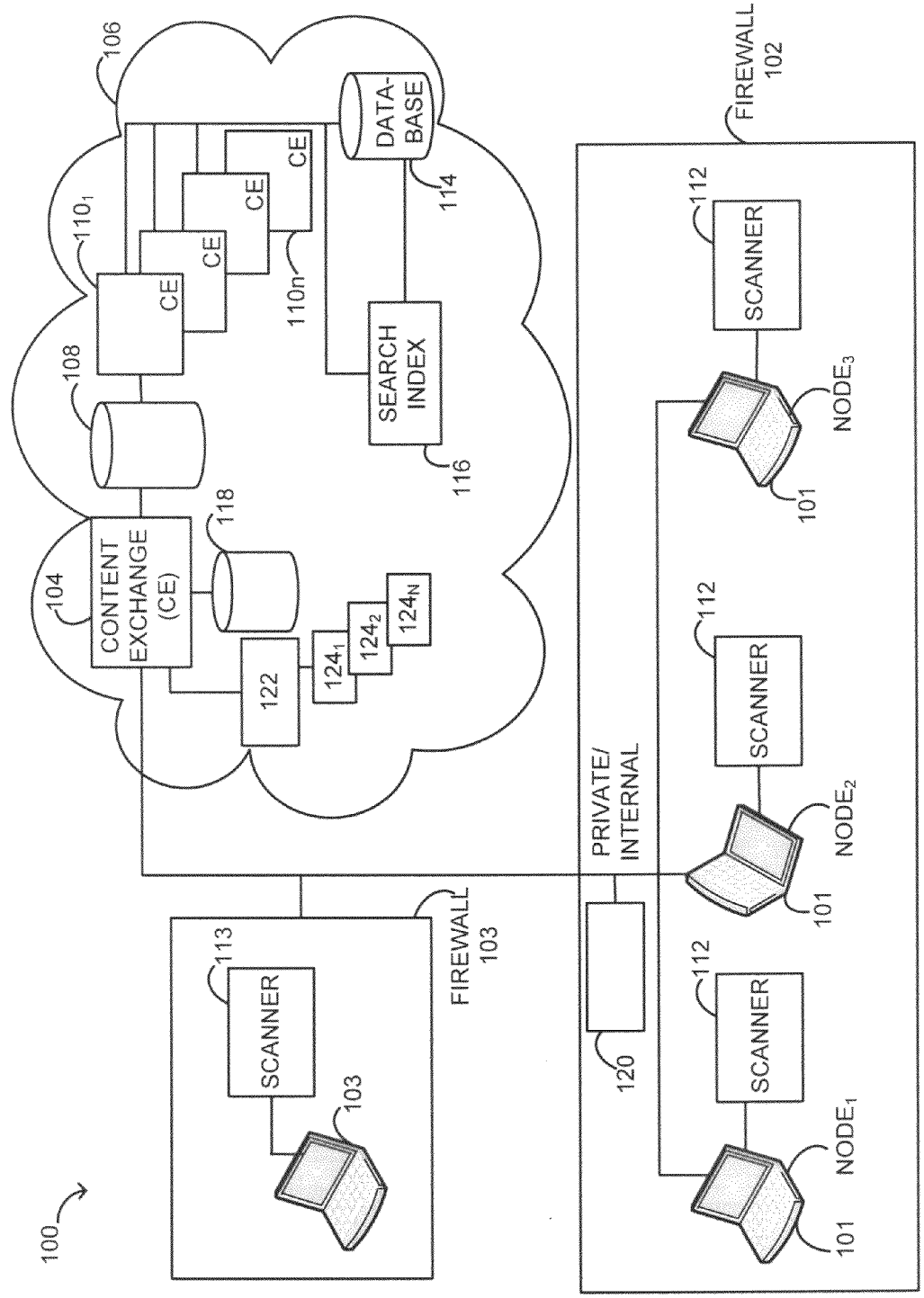
FIG. 1 shows a schematic of one embodiment of a content matching system.

The following description describes exemplary embodiments of an improved system and method for accurately determining the composition of an item of protectable content. More specifically, the description details embodiments of a system and method for reducing noise, or eliminating redundancies and/or inaccuracies, contained within a set of potential match results identified during a deep discovery or content matching analysis of one or more items of protectable content.

For purposes of this discussion, items of protectable content may include portions or snippets of source code or object code, individual or bundled source code or object code files, binary code files, directory structures and/or trees, open source software projects or packages, and/or proprietary software applications or packages. Notably, while some embodiments may be described with specific reference to open source software packages and/or projects or with respect to open source software in general, the systems and methods described below are equally applicable to items of proprietary software content. Further, while various structure and functionality for implementing an improved deep discovery analysis will be detailed below, this discussion is aided by an understanding of various terms that are relevant to content matching. For instance, a content matching analysis may generally include various steps. It may include a scanning process in which items of protectable content from a user ("items of user content") are loaded for analysis. It may also include a comparison process in which the items of user content are compared to items of protectable content that are maintained within a centralized database ("items of comparison content") in order to identify one or more potential matches (e.g., open source projects or proprietary applications) that include one or more portions or snippets of code that are similar to one or more portions or snippets of code contained in the items of user content being analyzed.

The improved content matching analysis may also include a noise reduction process, in which the potential matches identified during the comparison process are examined and pared down according to a number of automatically, optionally, and/or iteratively applied noise reduction techniques. This process reduces the number of potential matches and, in one embodiment, may also result in positively identifying a number of confirmed matches. Information relating to the remaining potential matches as well as any confirmed matches may be provided to the user. This information may include, for example, a name of the software package (e.g., open source project or proprietary software application) that makes-up each of the confirmed and/or remaining potential matches along with a number of user files that match against the software package, associated file names and sizes, file and/or package creation and revision dates, versions, and directory structures and/or trees. The information may also include applicable license information and use obligations associated with each of the confirmed matches. Moreover, the information may identify whether there are conflicts between the applicable licenses and/or use obligations associated with any of the confirmed matches. Notably, the steps described above may occur in any appropriate order, as discussed further below.

To guide a detailed discussion, the following description is divided into a number of sections. Section I describes the physical layout and functionality of an exemplary deep discovery or content matching system for use in performing deep discovery analyses. Thereafter, Section II details an exemplary protocol for use in performing a deep discovery analysis as well as the information that the deep discovery system provides to a user as part of the deep discovery analysis. This discussion explains several mechanisms that enable the deep discovery system to achieve more accurate, timely, and comprehensive match results, as well as several noise reduction techniques that the deep discovery system may selectively apply to reduce or eliminate noise and/or false positives from the match results.

The following description should be understood as exemplifying the invention without limiting it. In addition, while various embodiments of the present invention are described in detail, it is apparent that further modifications and adaptations of the invention will occur to those skilled in the art.

I. The Deep Discovery System

FIG. 1 shows a functional schematic of an exemplary deep discovery system 100. In this embodiment, the deep discovery system 100 is shown with three client nodes 101 connected on a private network behind a first user firewall 102 and one client node 103 connected behind a second user firewall 103. The client nodes 101, 103 may be any appropriate network devices such as, for example, laptop computers or desktop computers. Each of the client nodes 101, 103 may download and locally store a scanner 112, 113 for receiving and uploading one or more items of protectable content from a user ("items of user content"). The scanner 112, 113 may scan the items of user content to collect electronic signatures or fingerprints associated with the items of user content. Rather than the textual content of the items of user content, the electronic signatures are hashed secrets that may be used to represent the items of user content in the deep discovery analysis, as detailed below.

Each of the client nodes 101, 103 may be independently connected to a computer-based content exchange 104. In one embodiment, the content exchange 104 is maintained in a cloud computing architecture 106, in which shared hardware and software resources are provided on-demand in an Internet-based computing environment. The content exchange 104 provides software as a service ("SaaS") that is deployed over the Internet and, in this regard, each of the client nodes 101, 103 may access the hosted hardware and software resources of the content exchange 104 through an Internet browser available at the client node 101, 103. Maintaining the deep discovery system 100 within the cloud architecture 106 allows the system 100 to employ grid computing techniques to harness massive computing resources quickly and easily in parallel. In this regard, the system 100 may command the resources necessary to efficiently resolve immense data problems, potentially involving millions of files and tens of billions of lines of software code.

Within the cloud architecture 106, the content exchange 104 couples with a queue module 108. In this embodiment, the queue module 108 stores and organizes content matching analysis requests from the client nodes 101, 103 before forwarding the requests to assigned virtual content exchanges $110_{1-n}$ for processing. Each virtual content exchange $110_{1-n}$ is essentially a copy of the content exchange 104 and provides the functionality of the content exchange 104. In addition, because the virtual content exchanges $110_{1-n}$ exist within the cloud computing architecture 106, they can be simply, efficiently, and dynamically scaled as necessary to manage the vast computing needs associated with addressing hundreds or even thousands of simultaneous content matching analysis requests from multitudes of client nodes 101, 103 resident across numerous client or user entities.

Each of the virtual content exchanges $110_{1-n}$ may have access to a comparison content database 114. The comparison content database 114 houses a library of items of comparison content for comparison to the items of user content submitted by users for deep discovery analysis. The comparison content database 114 contains a variety of information associated with the items of comparison content, including, for example, metadata detailing software package, project, and/or application names along with associated file names, file sizes, file dates, directory structures and/or trees, license information, and/or checksum information. The comparison content database 114 may also include hashed signatures or fingerprints that have been created from the source code files and/or the binary code files of the items of comparison content, as discussed below. In some instances, the comparison content database 114 also includes the full contents of the items of comparison content.

To maximize the utility of the comparison content database 114 and exploit institutional heuristic knowledge involving the complex web or network of associations that link the items of comparison content, the comparison content database 114 may also include a body of providence information that identifies the interdependencies and interrelationships between the items of comparison content. For example, the providence information may include dependency information. To demonstrate, the comparison content database 114 may include information relating that the JBoss project incorporates the JavaMail project, which incorporates the JavaBeans Activation Framework project. Thus, using this providence information, the deep discovery system 100 can determine which code originates in the JavaBean Activation Framework project and is merely reproduced in the JavaMail and JBoss projects, which code originates in the JavaMail project and is merely reproduced in the JBoss project, and which code originates in the JBoss project. Other providence information may include, for example, information relating to software versions, copyright dates, license types, plug-ins between items of comparison content, parent and child relationships between various items of comparison content, naming conventions used to signify or indicate the relationships between the items of comparison content, and so on.

In one embodiment, a search index 116 may be coupled between the virtual content exchanges $110_{1-n}$ and the comparison content database 114. The search index 116 is indexed to quickly locate information stored within the comparison content database 114. During a content matching analysis, the virtual content exchanges $110_{1-n}$ may query the search index 116 in a round-robin manner in order to request specific information from the comparison content database 114. In this regard, the virtual content exchanges $110_{1-n}$ apply various sophisticated matching and/or noise reduction techniques, detailed below, to determine appropriate search queries and an appropriate order for those queries.

In response to the queries from the virtual content exchanges $110_{1-n}$, the search index 116 performs the requested searches. If the requested information is available in the comparison content database 114, the search index 116 collects the requested information and returns it to the querying virtual content exchange $110_{1-n}$. The virtual content exchanges $110_{1-n}$ may use the returned information to construct additional or follow-on search queries to the search index 116. Additionally or alternatively, the returned information or information derived from the returned information may be displayed to the user via the web-based content exchange 104, which is viewable through the Internet browser at the client node 101. This information may include a list of potential matches identified from among the items of comparison content, including the names of software packages, projects, and/or applications found, the number and names of user files associated with those packages, projects, and/or applications, applicable software models, license information, use obligations, and conflicting license requirements and/or use obligations associated with the various identified matches. The information provided to the user may also include whether the matching packages are certified and supported as well as provide the terms associated with any service level agreement ("SLA") that sets forth, for example, any requisite service requirements and how quickly service requests must be met. Further details regarding the match results are provided below.

In one embodiment, the information provided to the user may tie into an organizational software use policy that sets forth use parameters regarding use of protectable content within an organization. For example, the content exchange 104 may inform the user that the organization with which the user is employed prohibits all use of software subject to the GPL license, which is associated with specific ones of the items of user content being analyzed. In this regard, the content exchange 104, and therefore the virtual content exchanges $110_{1-n}$, may independently access a client information repository 118. The client information repository 118 provides multiple virtual private databases that store private, user-related information such as employee names and roles, use permissions, software use policies, and/or software request and/or approval guidelines. The virtual content exchanges $110_{1-n}$ may consult this information in determining whether the items of user content being analyzed comply with the user's policy, conditionally comply with the user's policy (e.g., the items of user content comply with the user's policy so long as certain use obligations are met), or conflict with or violate the user's policy.

The client information repository 118 may also be used to house private code libraries associated with the users of the deep discovery system 100. That is, when items of user content are scanned by the scanner 112 to begin a deep discovery analysis, the scanner may obtain metadata relating to the items of user content as well as create and collect private electronic fingerprints or signatures that represent the items of user content in a manner that is sufficient to identify matches against the items of comparison content, as discussed below. These private signatures are one-way hash-type codes that cannot be reverse-engineered to reconstruct the original source or binary code. The metadata and the private signatures may be stored in the client information repository 118, thereby creating a private library of code associated with the particular user (e.g., a particular organizational client), allowing future content matching analyses of that user's user content to be compared against items of protectable content within in the user's private library as well as the publically-available items of comparison content stored within the comparison content database 114. Because generally the signatures, and not the source or object code, are stored within the client information repository 118, the user is able to compare against its own private library without risking public exposure of confidential information.

In some instances, the user may take a more conservative approach and store the private signatures in a private proxy 120 that is located behind the user's firewall 102. In one embodiment, the private proxy 120 may store both the private signatures and the actual source or binary code. When and if it becomes necessary to compare or match against items of comparison content stored within the comparison content database 114, the private proxy 120 may communicate with the content exchange 104 to access the search index 116 and the comparison content database 114. In other instances, the user may elect to allow the private signatures representing its items of user content to be stored in the comparison content database 114 so as to expand the publically-accessible library of comparison content with which all future items of user content are compared.

In one embodiment, the content exchange 104 may also couple with a provisioning and validity module 122, which in turn connects with a number of virtual machines $124_{1-n}$. The provisioning and validity module 122 and virtual machines $124_{1-n}$ may cooperate with the content exchange 104 to provision to third parties items of user content that have undergone a deep discovery analysis. In this regard, the provisioning and validity module 122 may associate the results of the deep discovery analysis with each item of user content that is made available for provisioning, essentially creating a bill of materials that accompanies each of the items of user content being provisioned.

Notably, the provisioning and validity module 122 and the virtual machines $124_{1-n}$ may be owned and operated by one or more third parties and merely coupled with the content exchange 104. For instance, several companies such as, for instance, rPath, Inc., RightScale, Inc., Cohesive Flexible Technologies Corp., currently offer cloud computing and software provisioning solutions. In this regard, software packages are bundled and run on virtual machines as a service. The deep discovery analysis may be integrated with this concept to provide cloud computing and software provisioning service providers assurance that they are indeed provisioning the composition or bundle of software intended.

Further, the provisioning and validity module 122 may be used to digitally mark (e.g., watermark) the bill of materials to provide a certification or guarantee that the particular software bundle has undergone a deep discovery analysis and that the bill of materials accurately reflects the composition of the provisioned software bundle as of a certain date or phase in the software distribution process. As a result, the deep discovery analysis may be used to provide supply chain management for provisioned software.

II. The Deep Discovery Analysis

A. Set-Up and Tuning System Controls

Figure 2:
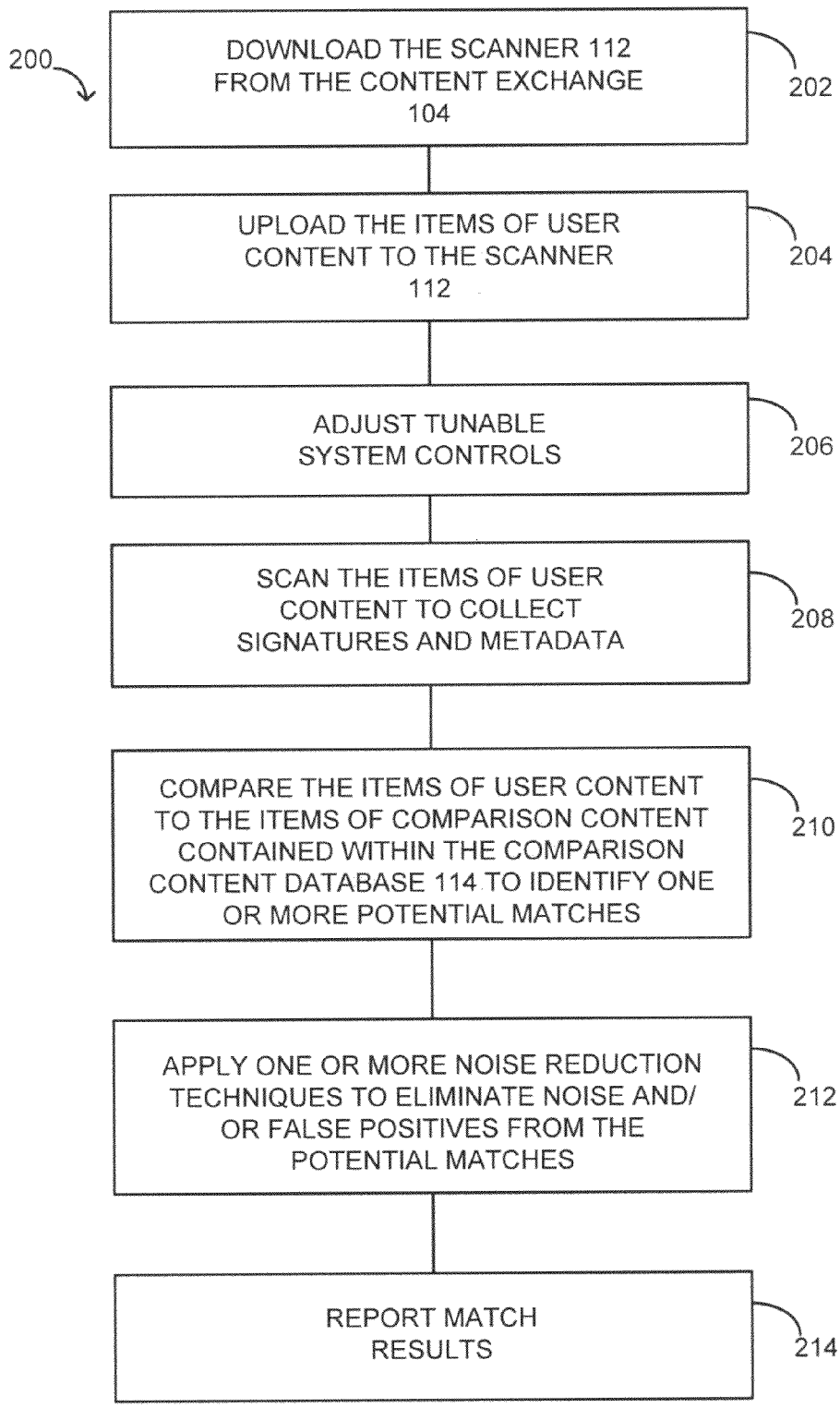
FIG. 2 is a flow chart illustrating a protocol for performing a content matching analysis.
Figure 3:
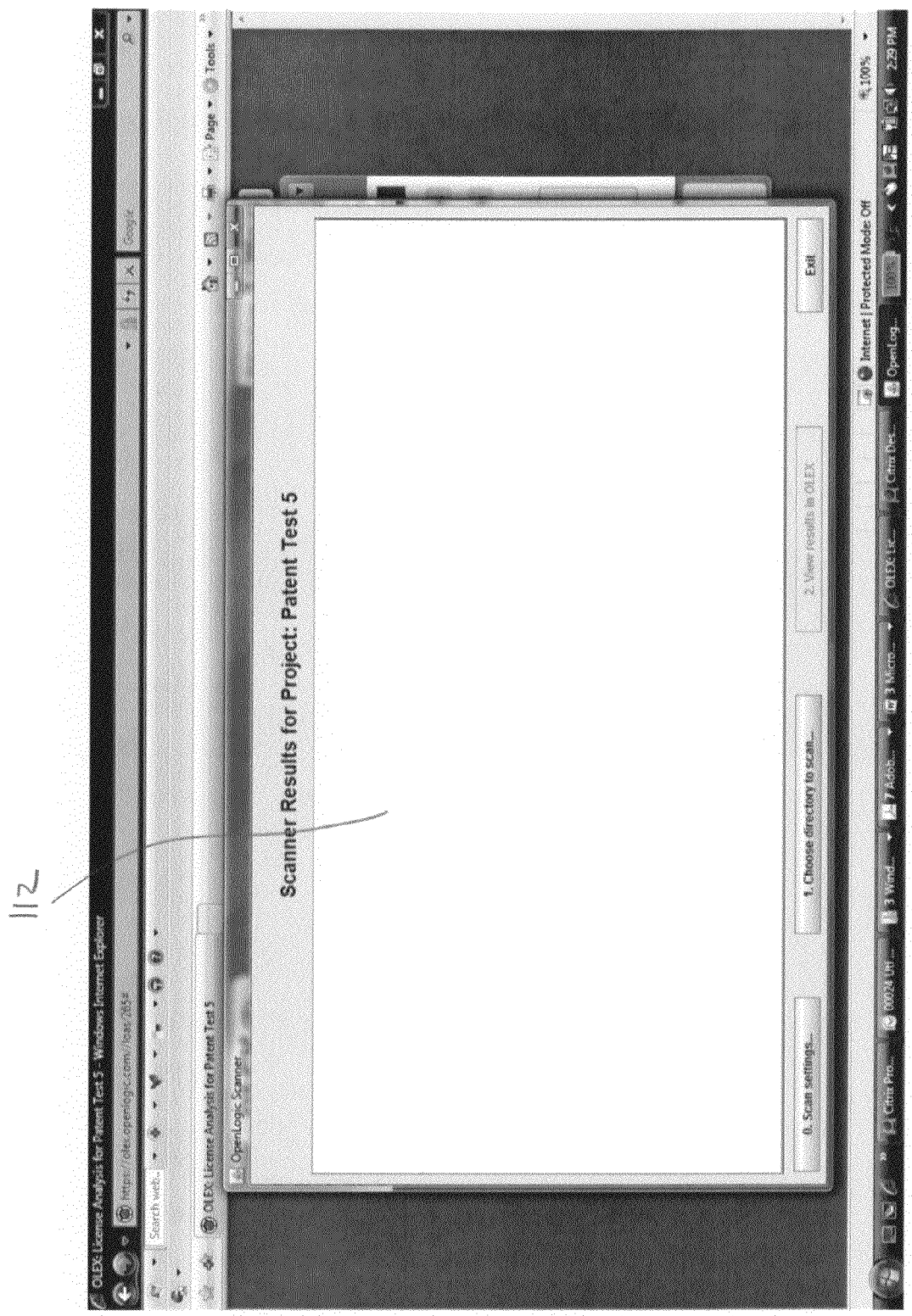
FIG. 3 is a screenshot illustrating one embodiment of a scanner as loaded onto a client node of the content matching system of FIG. 1.
Figure 4:
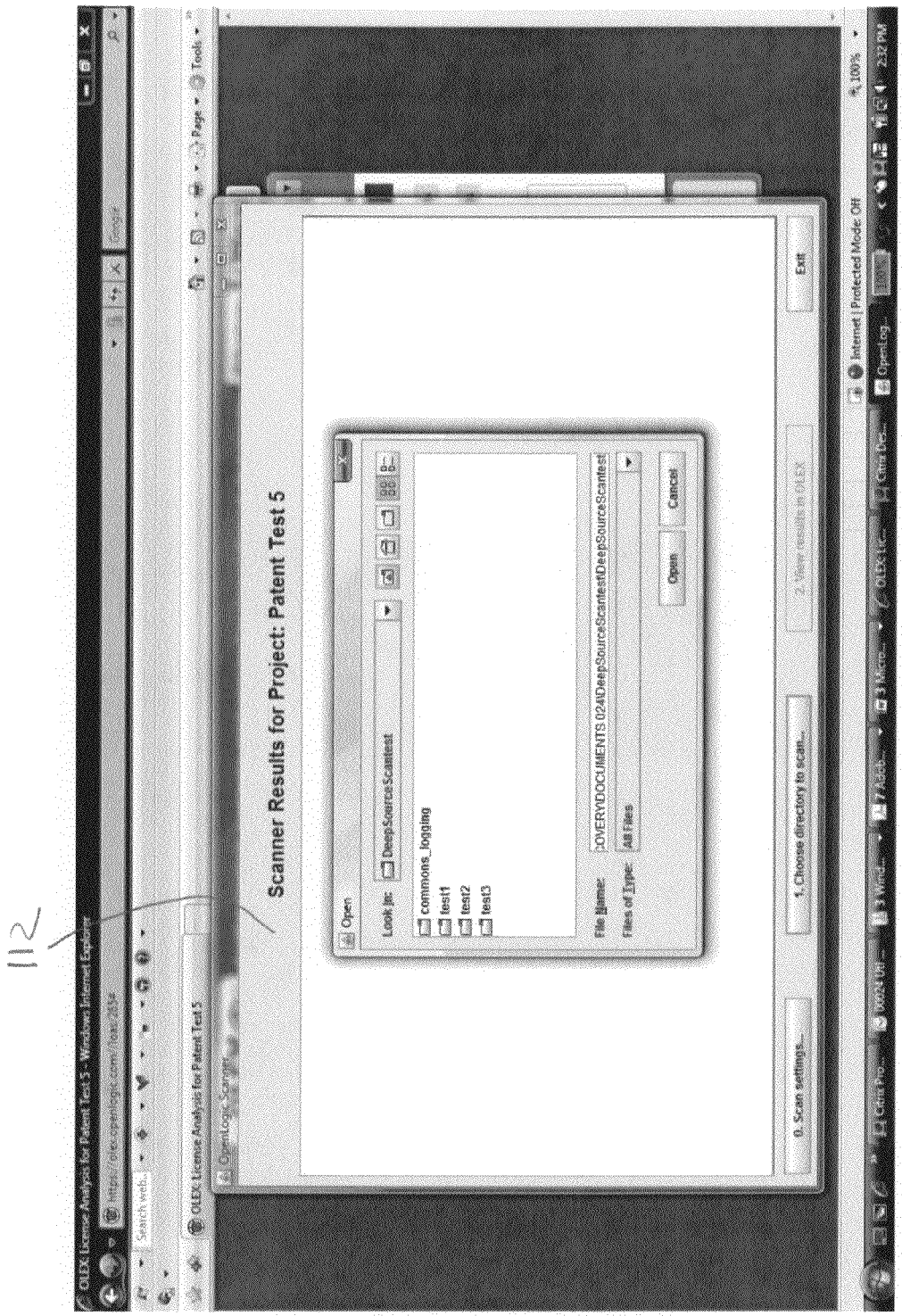
FIG. 4 is another screenshot illustrating the scanner of FIG. 3.

FIG. 2 sets forth one embodiment of a deep discovery or content matching protocol 200 for performing a deep discovery analysis. In this embodiment, the deep discovery protocol 200 initiates when a user downloads the scanner 112 from the content exchange 104 to the client node 101 (202), as shown in FIG. 3. Once the scanner 112 is operational at the client node 101, the user may load one or more items of user content to the scanner 112 (204) by browsing the directories available to the client node 101, either locally or through a network, and selecting the directory that contains the items of user content to be analyzed, as shown in FIG. 4. Once uploaded, a number of tunable system controls may be adjusted (206) to achieve the most desirable match results. Notably, the system controls may be adjusted (206) before and/or after the user has loaded the items of user content to the scanner 112 (204). That is, while FIG. 2 shows the steps of the content matching protocol 200 as occurring in a particular order, it should be understood that the steps of the protocol 200 may occur in any order that is appropriate and/or necessary.

This adjustment (206) of the tunable system controls may include manual selections made by the user or it may involve automatically and dynamically optimizing and/or deriving any appropriate system options, values, weightings, and/or thresholds in order to achieve optimal match results. For example, and as detailed further below, the user and/or the system 100 may define an ideal or maximum number of matches to be returned in the match results, a size of a match threshold (e.g., a number of lines of similar code to identify a match), a granularity of signatures or fingerprints to match against (e.g., file, block, line), and/or a type of signature or fingerprint to match against. In addition, the system controls may be derived from mandates or guidelines set forth in an applicable user policy or set of software use guidelines or in a policy or set of guidelines instituted by an operator of the deep discovery system 100. In addition, the tunable system controls may define file types and/or extensions within the items of comparison content to ignore, include, and/or treat specially, and the system controls may define certain rules around matches. For instance, the rules may define a minimum and/or a maximum file size to match against or they may identify certain key phrases that, when contained within the content of an item of comparison content, indicate whether the item of comparison content should be ignored, included, or otherwise treated specially during the matching analysis.

To hone the deep discovery system's ability to automatically optimize the tunable system controls, the system 100 may periodically analyze the items of comparison content contained within the comparison content database 114. Because the compositions of the items of comparison content are known, the system 100 may continually improve its optimization settings by (1) applying system control optimization techniques to the deep discovery analysis of the items of comparison content; (2) comparing the deep discovery analysis results for the items of comparison content to the known composition of the items of comparison content; and (3) using the comparison as a feedback mechanism to continually improve the system's ability to optimize or derive system controls that result in the best match results.

B. Scanning the Items of User Content

The deep discovery protocol 200 continues when the scanner 112 scans (208) the items of user content, which may involve copying and storing the full contents of the items of user content and/or storing metadata associated with the contents of the items of user content in the client information repository 118. The scanning step may also involve creating hashed fingerprints or signatures that represent the items of user content and storing the signatures within the private proxy 120 behind the firewall 102, within the client information repository 118 of the cloud architecture 106, and/or within the comparison content database 114, as discussed above.

Notably, and as discussed above, the scanner 112 may scan (208) the items of user content at any appropriate stage of the deep discovery protocol 200. For instance, the scanner 112 may scan the items of user content (208) before and/or after the user tunable system controls are adjusted (208). This flexibility allows the system controls to be adjusted (206) between repeated content matching analyses of the same items of user content. That is, after the items of user content have been initially uploaded (204) and scanned (208), the deep discovery system 100 may use the same signatures and metadata in multiple subsequent content matching analyses of the previously scanned items of user content. For example, various system and/or protocol enhancements (e.g., improved matching techniques, improved noise reduction techniques) may occur after the first content matching analysis is complete. In this regard, the deep discovery system 100 may be used to perform one or more subsequent content matching analyses to "recalculate the matches" for the items of user content in light of the enhancements. These subsequent analyses may utilize the previously collected signatures and/or metadata with, in some instances, different system control settings.

Figure 5:
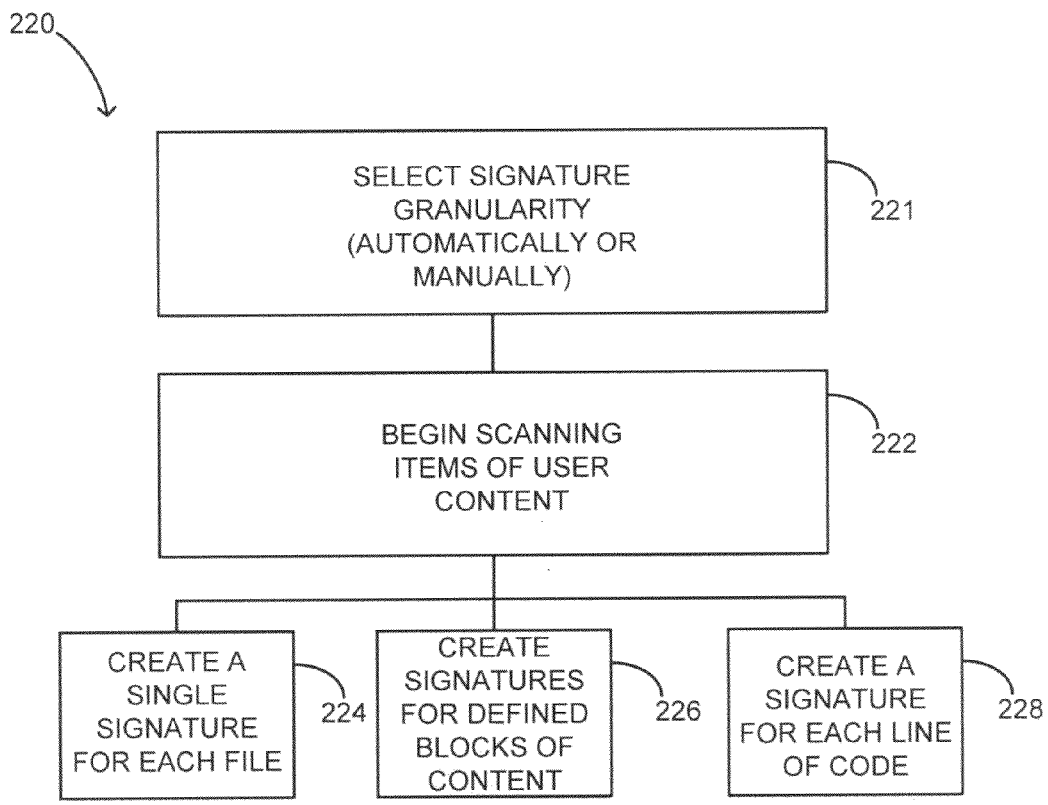
FIG. 5 is a flow chart illustrating one embodiment of a signature collection protocol for creating hashed signatures associated with items of protectable content.

Numerous signature collection protocols may be used to create the signatures, both for the items of user content being scanned for deep discovery analysis and for any items of comparison content being scanned for addition to the comparison content database 114. For example, FIG. 5 shows a signature collection protocol 220 for creating signatures having a range of granularities. The protocol 220 may begin with a selection regarding the appropriate or desired granularity or combination of granularities for the signatures to be created (221). This selection may be an automated decision made by the deep discovery system 100 or it may be a manual selection made by the user. After beginning the scan (222), the scanner 112 may proceed to hash each of the source code or binary code files down into a single signature (224). Alternatively, the scanner 112 may individually hash defined blocks of text or bytes contained within a file (226) depending on the selected granularity. For example, first, second, and third signatures may include blocks of code that encompass bytes 1-500, bytes 501-1000, and bytes 1001-1500, respectively. The blocks may be staggered such that the hashed signatures correspond to overlapping blocks of text or bytes of data, and the number of characters allotted to each of the blocks may vary. If an even finer granularity is desirable and/or appropriate, the scanner 112 may hash individual lines of code (228).

Figure 6:
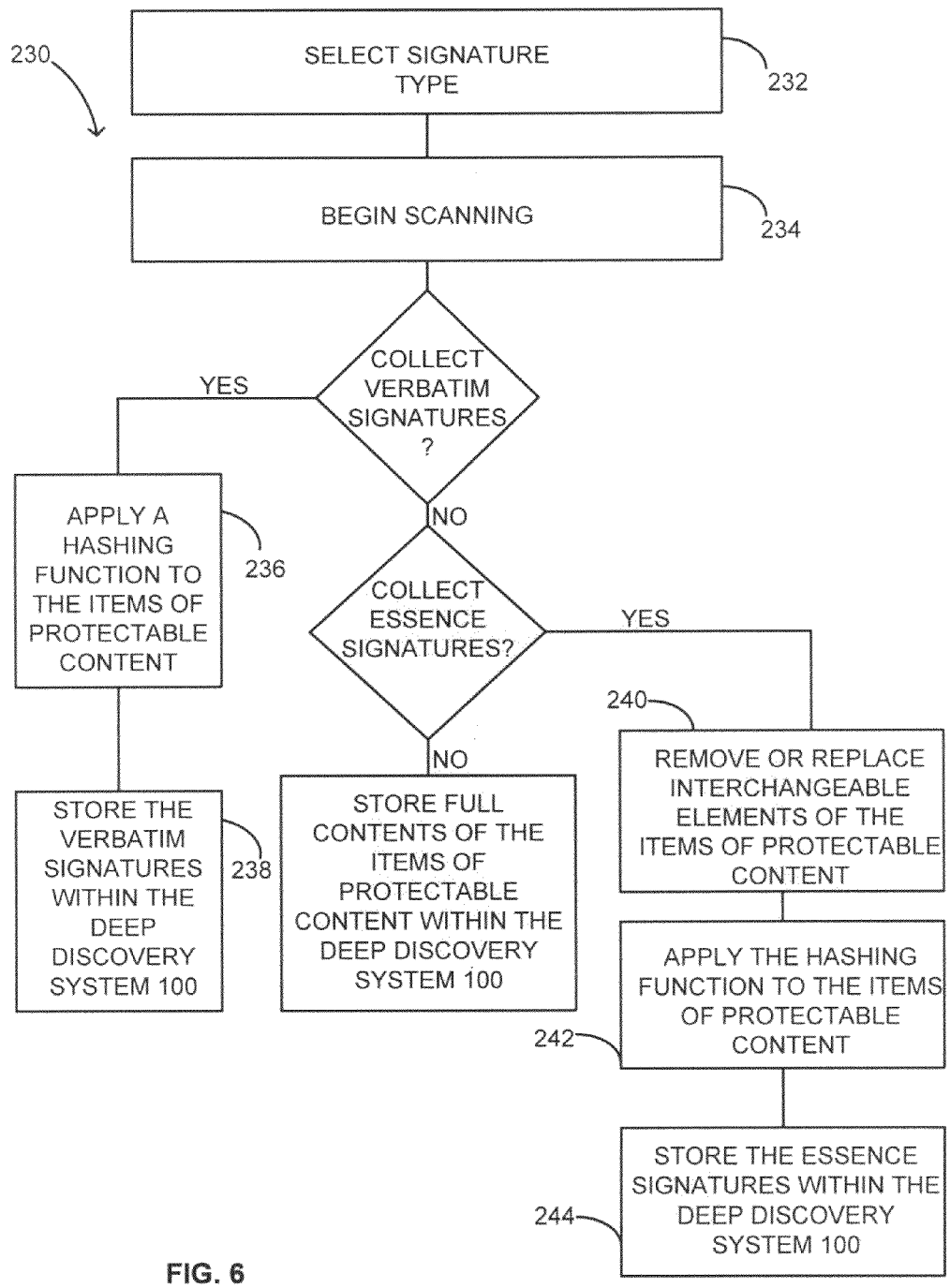
FIG. 6 is a flow chart illustrating another embodiment of a signature collection protocol for creating hashed signatures associated with items of protectable content.

Regardless of the granularity of the signatures, the scanner 112 may create verbatim signatures or essence signatures. FIG. 6 illustrates an exemplary signature collection protocol 230 for creating either verbatim or essence signatures. To begin, a selection is made regarding the signature type (232). Similar to the selection regarding granularity, this selection may be automated or the user may manually select the type of signature to collect. If the scanner 112 is to collect verbatim signatures, the scanner 112 begins scanning (234) before applying a hashing function to each applicable granulation of the items of protectable content in their unaltered states (236). That is, the verbatim signatures are created by hashing the source code or binary code down into signatures without modifying the code in any meaningful way. The signatures, all metadata associated with the items of protectable content, and in some instances, the full contents of the items of protectable content are then stored within the appropriate component of the deep discovery system 100 (e.g., the client information repository 118, the private proxy 110, the comparison content database 114) (238).

In this embodiment, if the scanner 112 is to collect essence signatures, the scanner 112 may remove and/or replace all of the of the interchangeable elements or "white space" contained within the code text or bytes (240) before applying the hashing function to create signatures representing the items of protectable content (242), again to each applicable portion or granulation of code, and storing the signatures within the appropriate component of the deep discovery system 100 (244).

Examples of the interchangeable elements include, for instance, variable names, comments, spaces, tabs, new line characters, end line characters, and so on. Because these interchangeable elements are not present in the hashed signatures, the hashed signatures capture the essence of the code contents but are more flexible and allow the deep discovery system 100 to match items of user content against items of comparison content even if the code contents are not identical. For example, the system 100 may identify a match in instances where the two items of protectable content are developed using different operating systems that typically use different line endings and new line characters (e.g., Windows versus Linux) or where certain interchangeable elements of the user code are altered in an attempt to copy existing code without detection (i.e., altering of variables, removal or revision of comments, etc.). In this regard, the deep discovery system 100 can identify matches based on similar, but not necessarily identical, code text.

C. Comparing the Items of User Content to the Items of Comparison Content

Returning to FIG. 2, the deep discovery protocol 200 continues with a comparison (210) of the items of user content that have been scanned and stored within an appropriate component of the deep discovery system 100 to the items of comparison content stored within the comparison content database 114. This comparison (210) identifies a set of potential matches, or a set of items of comparison content that include a matched portion that is similar to a portion of at least one of the items of user content being analyzed.

Figure 7:
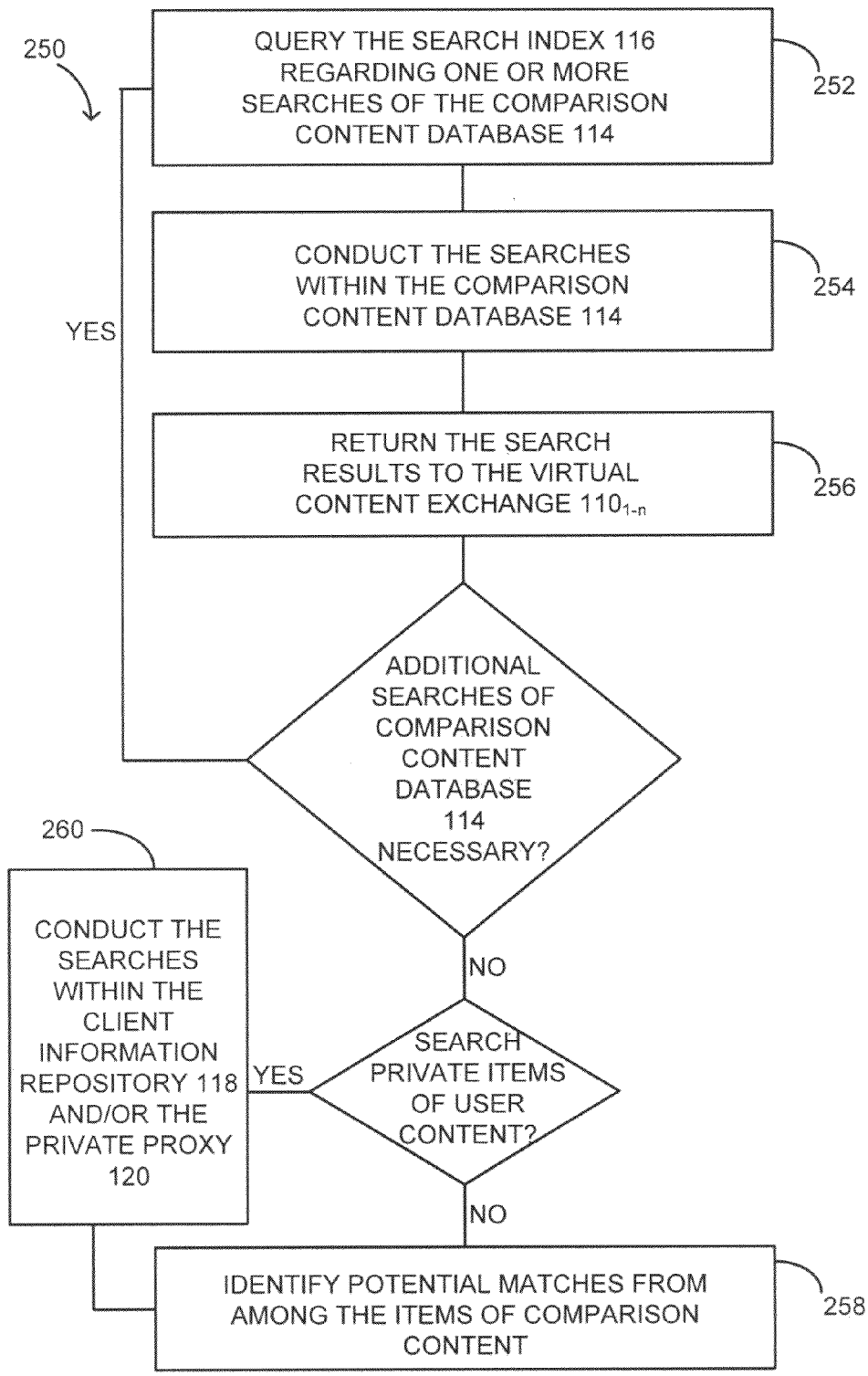
FIG. 7 is a flow chart illustrating one embodiment of a protocol for comparing an item of user content against numerous items of comparison content.

The comparison (210) may involve comparing various parameters associated with the items of user content and the items of comparison content including, for instance, file names, file directories, file sizes, file contents (e.g., windows of code text or bytes of data), license types, hashed signatures representing any of these parameters, and/or combinations of any of these parameters. FIG. 7 shows an exemplary comparison protocol 250 that may be used to carry out the comparison (210) of FIG. 2. While the comparison protocol 250 is described with respect to specific components of the deep discovery system 100, the comparison protocol 250 may be implemented by or at any appropriate component of the deep discovery system 100 or distributed throughout various components of the system 100. Moreover, while the steps of the comparison protocol 250 are described in a specific order, they may be carried out in any order that achieves the desired content comparison (210).

Upon being assigned a number of items of user content for a content matching analysis request, the virtual content exchange $110_{1-n}$ may direct the comparison (210) between the items of user content and the items of comparison content by formulating queries to the search index 116 regarding one or more searches of the comparison content database 114 (252). The virtual content exchange $110_{1-n}$ may instruct the search index 116 to perform the searches in any appropriate order including, for instance, sequentially or iteratively as results are returned from the comparison content database 114 to the virtual content exchange $110_{1-n}$ via the search index 116. In response to the queries from the virtual content exchange $110_{1-n}$, the search index 116 may conduct the queried searches within the comparison content database 114 (254).

Next, the results of the searches may be returned to the virtual content exchange $110_{1-n}$ (256) for use in identifying potential matches (258) from among the items of comparison content. For example, if the information requested by the virtual content exchange $110_{1-n}$ (e.g., a code snippet, a file name, a directory structure) is available within the comparison content database 114, the search index 116 may retrieve that information and return it to the virtual content exchange $110_{1-n}$ for use in identifying items of comparison content that include matched portions that are similar or identical to portions of the items of user content. If the information requested by the virtual content exchange $110_{1-n}$ is not encompassed within any of the items of comparison content stored within the comparison content database 114, the search index 116 may inform the virtual content exchange $110_{1-n}$, which may then construct additional queries and/or eliminate items of comparison content from consideration. The steps of querying the search index 116 (252), searching the content database 114 (254), and returning the search results to the virtual content exchange $110_{1-n}$ (256) may be repeated any number of times necessary to search the body of comparison content contained within the comparison content database 114 in any appropriate manner, including comprehensively or in a targeted and/or specialized manner.

In performing the queried searches (254), the deep discovery system 100 may compare signatures created from the items of user content and the items of comparison content rather than the source code or binary code itself, as discussed above. Further, because the signatures may be essence signatures that abstract the code text by removing and/or replacing the interchangeable elements of the code, the comparison (210) may involve essence matching, which may identify instances in which portions of the items of user content are similar, but not identical, to the items of comparison content from which they may have been copied.

Employing signatures allows a user to match against both the public code library contained within the comparison content database 114 as well as its own library of private code without risking the confidentiality of the user's private code. That is, because the signatures are created using a one-way hash function and cannot be reversed to reconstruct the original source code or binary code, the code remains secret even if the signatures are stored within the client information repository 118 within the cloud architecture 106. In this regard, the full contents (e.g., the source code) of the items of user content may remain behind the firewall 102, while the signatures representing the items of user content submitted for analysis are allowed to accumulate within the client information repository 118 to form another body of comparison content against which new items of user content may be compared, thereby extending the concept of deep discovery analysis to private content and creating a vehicle for continuously building a library of user-specific private content for the user to compare against with each new deep discovery analysis.

In another embodiment, the user may elect to store the full contents of the items of user content (e.g., the code text) and/or signatures associated with its items of user content within the comparison content database 114 such that any and all users of the deep discovery system 100 may match against that user's private library. In a more conservative implementation, the user may store all information related to its items of user content within the private proxy 120 behind the firewall 102, as discussed above. In this embodiment, neither the user's code nor the corresponding signatures are placed in the cloud architecture 106, reassuring the user of the confidentiality of its items of protectable content. While storing the private libraries within the cloud architecture 106 (e.g., the client information repository 118, the comparison content database 114) facilitates maintenance and scaling of the hardware and/or software required to manage the private libraries, the various embodiments are equally technically feasible.

When the user elects to search its private items of user content, the exemplary comparison protocol 250 of FIG. 7 may include an additional step in which one or more of the queried searches originally constructed for searching the comparison content database 114 or one or more new searches are conducted within the user's stored items of user content within the client information repository 118 and/or the private proxy 120 (260).

Figure 8:
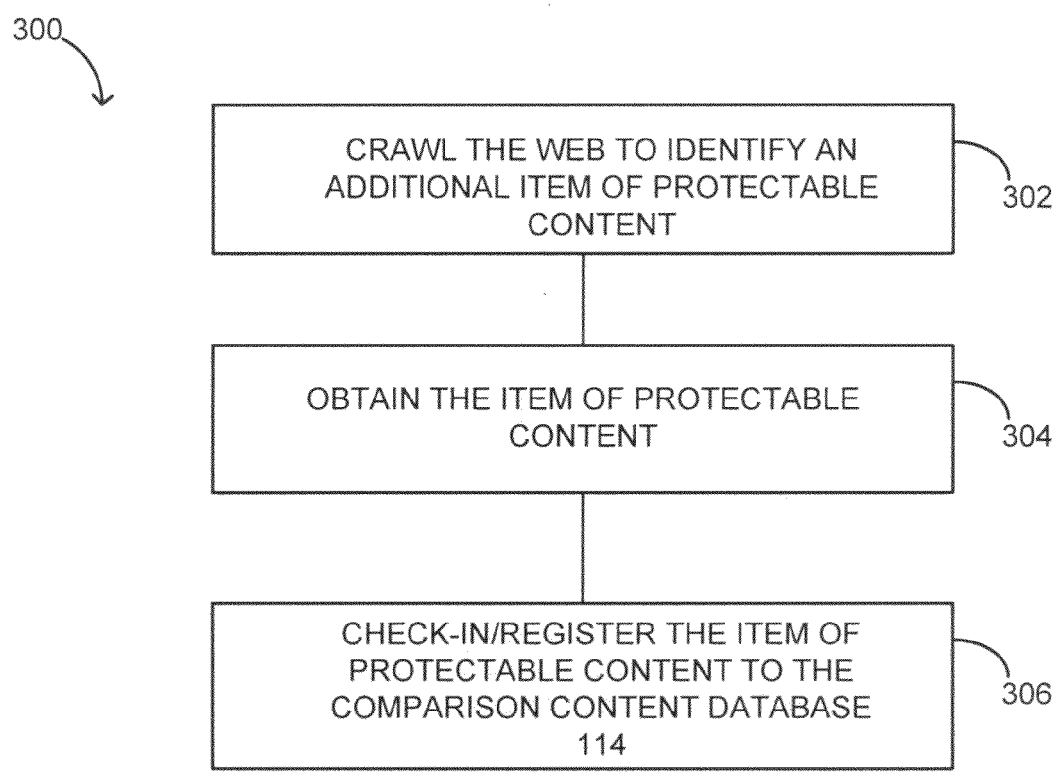
FIG. 8 is a flow chart illustrating one embodiment of a protocol for use in expanding a comparison content database included within the content matching system of FIG. 1.

To ensure the comparison content database 114 remains both current and comprehensive, the deep discovery system 100 may mine the Internet for additional items of comparison content to continually expand the comparison content database 114. In this regard, FIG. 8 shows an exemplary protocol 300 for use in expanding the comparison content database 114. In this implementation, the protocol 300 may begin with the content exchange 104 crawling various websites to identify additional items of comparison content for inclusion in the comparison content database 114 (302). For example, the content exchange 104 may review, either automatically or upon instruction, web-based open source or proprietary software repositories, which maintain and make publically available various items of protectable content, and meta-repositories, which contain lists or indices of software maintained on other websites. Once the content exchange 104 identifies an item of comparison content for inclusion in the comparison content database 114, the content exchange 104 may obtain (e.g., download) the item of comparison content (304) before registering or checking the new item of comparison content into the system 100 such that it joins the continually growing library of items of comparison content contained within the comparison content database (306). The registration/check-in process (306) may involve scanning and collecting signatures associated with the item of comparison content and storing the signatures as well as the file contents and associated metadata within the comparison content database 114. The associated metadata or other information that is stored in relation to the new item of comparison content may convey providence information that reflects how the new item of comparison content interrelates with the items of comparison content already stored within the comparison content database.

Using the expansion protocol 300, the content exchange may function automatically and continuously to locate newly developed items of protectable content and new versions of or updates to existing items of comparison content for addition to the comparison content database 114. Moreover, the comparison content database 114 may continually expand to include various formats of the items of comparison content contained in the comparison content database 114. This allows the deep discovery system 100 to recognize matches for items of user content that have been hashed from any format. For example, the file "prototype.js" is a JavaScript file that runs on an internet browser and is available as open source software in the ".js" format, subject to the MIT license. The file can be compressed in a number of ways, which may change the name of the file from "prototype.js" to another format such as, for example, "prototype.minify," which allows the file to transmit from the web to the browser more quickly. The system 100 may recognize that these various formats identify the same item of comparison content (i.e., the Prototype project) such that the user simply receives match results that identify the Prototype open source project as a match, regardless of which file format was used to create the signatures for the user's content.

D. Reducing Noise in the Potential Matches

Figure 9:
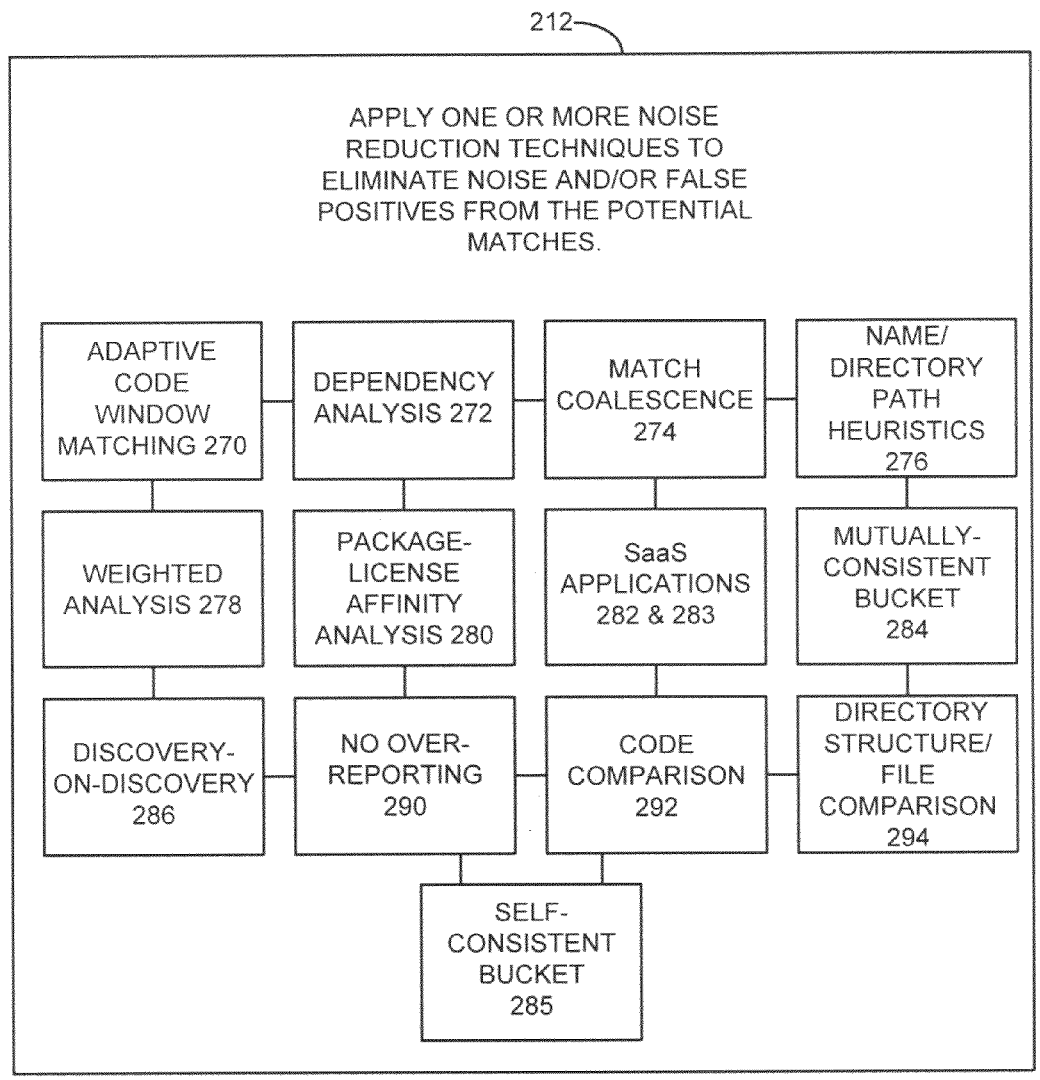
FIG. 9 is a flow chart illustrating a number of noise reduction techniques that may be applied to eliminate false positives from a set of potential content matching results.

FIG. 9 graphically depicts a number of noise reduction techniques that may be implemented to eliminate noise and/or false positives (e.g., redundant potential matches or erroneously identified potential matches) from the potential matches (212). Stated differently, the noise reduction techniques may be employed to eliminate one or more of the potential matches. In one embodiment, applying the noise reduction techniques may also result in positively identifying one or more confirmed matches from among the potential matches. The deep discovery system 100 may implement many of the noise reduction protocols automatically, while the user may manually interact with the system 100 to implement others. Moreover, the noise reduction techniques may be applied in any appropriate order. For example, in one embodiment, one or more of the noise reduction techniques described below may be selected for sequential application. In another implementation, the techniques may be selected and applied iteratively as the noise reduction process (212) progresses. One or more of the noise reduction protocols may even be implemented as the comparison process (210) progresses.

In one embodiment, the content exchange 104 stores and implements instructions relating to each of the noise reduction techniques discussed below. In order to reduce the possibility of over-reporting in the match results even after the application of one or more the noise reduction techniques, the instructions relating to the noise reduction techniques are integrated (290) such that when the deep discovery system 100 applies numerous noise reduction techniques to a set of potential matches, either automatically or at the user's election, the confirmed match results reported to the user are largely free of duplicate matches that are simply reported in different ways.

Adaptive Code Window Matching

One noise reduction technique 270 that is useful in reducing the number of potential matches identified in the comparison (210) involves adaptive code window matching. In one embodiment, the adaptive code window matching technique 270 involves adaptively adjusting a threshold number of code lines, or a code window, at which the deep discovery system 100 identifies a potential match. For example, the system 100 may identify a potential match once a threshold number of lines of code from one of the items of user content are found within one of the items of comparison content. The system 100 may adaptively expand and shrink this threshold until an ideal number of potential matches is achieved. This adjustment may be based on numerous factors including, for instance, stored information relating to user preferences (e.g., a preferred number of matches), the function or purpose of the deep discovery analysis (e.g., to identify plagiarized code), statistical information defining an ideal or reasonable number of matches for different programming languages (e.g. a different sized code window may be appropriate to match Java code versus C code), and so on. The number of iterative adjustments may be limited. That is, the deep discovery system 100 may be limited to a specific number of iterative code window adjustments, may be limited to a defined period of time, or may be allowed to iterate until a desired number of matches is achieved.

Dependency Analysis

Another noise reduction technique 272 involves a dependency analysis. The dependency analysis noise reduction technique 272 involves examining a snippet or portion of code that has been identified as being included in both the item of user content and one or more of the potential matches identified during the comparison process (210) to determine whether the portion is native, rather than foreign, to any of the potential matches. This examination involves applying the providence information stored in the comparison content database 114, discussed above, to identify how the potential matches containing the snippet are related and whether the snippet or portion is native, or canonical, to any of the potential matches. The closer one of the potential matches is to a native package, project, or application, the easier it is eliminate others of the potential matches.

In a generalized example, Projects A, B, and C may be identified as potential matches for a particular snippet or portion of code from the item of user content being analyzed. In applying the applicable providence information to the Projects A, B, and C, the deep discovery system 100 may gain an understanding of the interrelationships between the Projects A, B, and C to determine whether the snippet is native to one of the projects and foreign to the others. For example, the deep discovery system 100 may identify that the snippet is native only to project A, which is the original source of the snippet and that the snippet appears in Projects B and C merely because those projects incorporate all or portions of Project A. In this case, the deep discovery system may eliminate Projects B and C from the potential matches.

Looking to the specific example discussed above, the potential matches may include the JBoss, JavaMail, and JavaBeans Activation Framework projects. Again applying the providence information to these projects, the deep discovery system 100 may determine that the JBoss project incorporates the JavaMail project, which incorporates the JavaBeans Activation Framework project. Thus, the system 100 has determined that the snippet is native to the JavaBeans Activation Framework project, and merely repeated in the JBoss and JavaMail projects. As a result, the system 100 may eliminate the JBoss and JavaMail projects from the potential matches.

Match Coalescence

Similarly, another noise reduction technique 274 involves ensuring that repetitive or redundant matches are excluded from the confirmed match results. The match coalescence noise reduction technique 274 involves applying the providence information to identify an optimal set of matches that does not duplicate software versions that fail to provide additional value to the user. That is, the deep discovery system 100 applies the providence information to identify whether the potential matches include various versions of the same item of comparison content. If the potential matches include essentially duplicate versions of the same item of comparison content, the system 100 may eliminate the redundancies.

For example, a set of potential matches identified in the comparison (210) between the item of user content and the items of comparison content may include twenty-five versions of the Tomcat project. Each of the twenty-five versions may include a snippet or portion of code from the item of user content. Rather than reporting all twenty-five versions in the confirmed match results, the deep discovery system 100 uses the providence information to detect each version, determine whether the same license type and/or terms apply to each version, and collapse the results into as few confirmed matches as possible. For instance, if the versions are substantially similar and the same license provisions apply to each version, the deep discovery system 100 may report that the confirmed match is the Tomcat project in general, rather than report each of the twenty-five versions. Alternatively, if the license provisions are different (e.g., an earlier version is subject to the Apache I license and a newer version is subject to the Apache II license), the deep discovery system 100 may report all or select ones of the versions in the confirmed match results.

Name and Directory Path Heuristics

Another noise reduction technique 276 involves an analysis of name and/or directory path heuristics to identify interdependencies and interrelationships between potential matches. That is, the noise reduction technique 276 involves identifying dependency relationships by examining file names and/or directory paths or structures. In the open source context, the rapid expansion and communal nature of the open source software community has spurred the development of numerous sub-projects, plug-ins, add-ons, extensions, and other parent and child-type relationships between items of protectable content. Over time, these dependency relationships have been reflected in recognizable software naming conventions. An understanding of these interrelationships, as well as the naming conventions that convey these interrelationships, may be memorialized within the providence information, discussed above, and applied to identify how an item of protectable content relates to other items of protectable content. Thus, the name and/or directory structure associated with a software package may indicate whether the software package is among a set of plug-ins or related packages or whether it is an umbrella package having many subprojects beneath it. Understanding how each potential match relates to others of the potential matches assists the system 100 in eliminating redundancy within the potential matches.

For example, if the comparison (210) between the item of user content and the items of comparison content identifies projects having the names "Eclipse—xxplugin" and "Eclipse" as potential matches to the item of user content, the deep discovery system 100 may apply the providence information to draw the conclusion that the Eclipse—xxplugin project is a dependent, child, or plug-in of the Eclipse project. After identifying this parent/child relationship, the deep discovery system 100 may retain only the smaller, original source (Eclipse—xxplugin) and eliminate the larger, redundant source (Eclipse project) from the potential matches.

In converse, applying the providence information to the potential matches may reveal a series of related projects that the system 100 understands makes up an entire umbrella project. That is, if the comparison (210) identifies a group of potential matches that the system 100, in applying the providence information, understands forms a larger umbrella package, the system 100 may eliminate the child packages and only report the larger umbrella package as the confirmed match. For instance, the open source Spring project is an umbrella package formed of numerous subprojects including, to name a few, Hibernate, JDO, iBATIS, JavaMail, Groovy, and Jaxen. If the comparison (210) identifies these and the remaining subprojects that form the Spring project, the system 100 may eliminate all of the subprojects from the potential matches and report only the Spring project as a confirmed match.

Weighted Analysis

Another noise reduction technique 278 involves weighting the items of comparison content according to a number of factors such that the potential matches are biased either towards or away from a center of the network of interrelationships and interdependencies between the items of comparison content. One of these factors may relate to a comparative commonality of use between the items of comparison content. For instance, in one embodiment, the comparison (210) may identify two projects as potential matches. A first of the potential matches may be the Tomcat project, which is one of the most widely used open source projects in the world. The second potential match may be an obscure algorithm developed by a graduate student at a state university to facilitate running automated overnight laboratory tests without human oversight. In this example, the deep discovery system 100 may weight the first and second potential matches such that the first potential match is biased toward the center of the web or network of interrelationship and interdependencies, indicating to the system 100 that the first potential match is more likely to be the confirmed match. Other factors that may be used to weight the items of comparison content include, for instance, a frequency with which an item of comparison content is downloaded, a statistical analysis reflecting noise reduction determinations made in previous deep discovery analyses, and manual weightings reflecting user preferences affecting noise reduction.

Package—License Affinity Analysis

Another noise reduction technique 280 exploits the relationship between the items of comparison content and the license types that apply to the items of comparison content. That is, because software packages, projects, and applications have licenses that govern their use, the deep discovery system 100 may apply a separate set of techniques to independently identify one or more licenses that apply to an item of user content that has been submitted for deep discovery analysis. This identification may be made separately from the comparison (210) between the item of user content and the items of comparison content, which is used to identify one or more potential matches. Because these two analyses are independent, they may be cross-referenced and used to eliminate false positives within the potential matches identified in the comparison (210). That is, each of the potential matches that have been identified as forming the item of user content may be compared against the license types to which the item of user content has independently been deemed subject. Applying the providence information to this comparison may reveal affinities between the identified potential matches and the identified licenses types, thereby elevating the probability that the potential matches that correspond to one of the identified license types are actual or confirmed matches.

For example, if a set of potential matches includes the open source Python project, and an independently-identified set of license types deemed applicable to the item of user content include the Python license, the deep discovery system 100 may recognize an increased probability that the Python project is a confirmed match or, in another embodiment, the deep discovery system 100 may eliminate the potential matches that are not subject to the Python license.

Mutually-Consistent Bucket

Another noise reduction technique 284 involves examining and reviewing for consistencies between the code text of the item of user content and one or more names associated with the potential matches identified in the comparison (210) between the item of user content and the items of comparison content. That is, if the code text of the item of user content recites a file, project, package, or application name that is associated with one of the potential matches, then the deep discovery system 100 may determine that the item of user content and the particular potential match are mutually-consistent and elevate the probability that the potential match is an actual or confirmed match. For instance, if the code text of the item of user content includes the term "prototype," and the comparison (210) identifies the Prototype project as one of the potential matches, then the system may determine that the item of user content and the Prototype project are mutually-consistent and elevate the probability that the Prototype project is an actual match.

Self-Consistent Bucket

A related noise reduction technique 285 involves examining and reviewing for consistencies between the names of the potential matches identified in the comparison (210) and their associated code texts to determine whether each of the potential matches is self-consistent. If the code text of a potential match recites a file, project, package, or application name associated with that potential match, then the deep discovery system 100 may determine that the potential match is self-consistent and elevate the probability that the potential match is an actual or confirmed match. In an example similar to the one described above, if the code text of a potential match includes the term "prototype," and the potential match is the Prototype project, then the system 100 may determine that the potential match (i.e., the Prototype project) is self-consistent and elevate the probability that the Prototype project is an actual match.

Code Comparison

Another noise reduction technique 292 involves a code comparison between the item of user content and one of the potential matches identified in the comparison step (210) of FIG. 2, where the code comparison is based on the fingerprints collected from the code. As discussed above, to complete the comparison (210) between the item of user content and the items of comparison content, the system 100 may access hashed signatures that reflect the code text for the item of user content, whether the signatures are stored in the private proxy 120 or the client information repository 118, and the items of comparison content contained in the comparison content database 114. The deep discovery system 100 may identify matches by computing differences and similarities between the code texts without ever referencing the actual code.

Once a set of potential matches is identified, the signatures may be used to facilitate a direct comparison between the code text of the item of user content and the code text of one of the potential matches. This is possible because the signatures associated with the item of user content and the potential match include sufficient metadata to locate the matched or copied portion within the source code of both the item of user content and the potential match. Thus, if the user desires to manually compare code text to assist in confirming or rejecting a potential match, the content exchange 104 may determine a location of the relevant portions of code within the item of user content and the potential match and direct the user node 101 to load and overlay the relevant portions of code text such that the user may manually confirm whether the portions of code do indeed match without ever exposing the full contents of the item of user content outside the firewall 102.

This side-by-side comparison between portions of the user's code and the code identified during the comparison step (210) of FIG. 2 is possible despite the fact that the deep discovery system 100 generally lacks access to the full contents of the items of user content (e.g., the user's code). Moreover, because the deep discovery comparison (210) of FIG. 2 is generally not based on the code text itself, but instead on the signatures and the metadata associated with the code text, the actual code text brought up behind the firewall 102 for comparison may not match character-for-character (e.g., interchangeable elements such as variables and spaces have been removed and/or replaced) even though the system 100 has indeed identified a match.

In another embodiment in which the user allows the full contents of the item of user content to be stored in the user information repository 118 within the cloud computing architecture 106 such that the deep discovery system 100 has access to the user's actual code, the code comparison 292 may occur between the actual code texts of the item of user content and the potential match.

Directory Structure/File Comparison

Another noise reduction technique 294 is similar to the code comparison technique 292, discussed above, but involves a comparison of local directory structures and/or peer or other files located within the local directory structures. That is, beyond manually comparing the code texts of the matching portions of the item of user content and the potential match, the user may wish to understand the directory structure surrounding where the matching portion was found within the potential match as compared to where the corresponding portion of the item of user content resides within the item of user content. Because the local directory structures detail where the files containing the matching portion fit in relation to their parent directories, child directories, and peer directories, the local directory structures associated with both the item of user content and the potential match provide insight regarding a probability that the potential match is an actual match. That is, similarities in parent, child, and peer directories may weigh in favor of a match, while a lack of similarity may weigh against a match.

Similarly, one or more peer files within a local directory structure may provide further insight regarding potential matches for an item of user content. For instance, if a user file has a number of peer files that have all been matched to one or more items of comparison content in a certain way, the system 100 may increase the probability that the user file is similarly related to the items of comparison content to which the peer files resolve.

Discovery-on-Discovery

An additional noise reduction technique 286 involves layering one or more noise reduction techniques with traditional content matching methodologies. The discovery-on-discovery noise reduction technique 286 involves first applying one or more of the noise reduction techniques discussed above (e.g., the adaptive code window matching technique 270, the dependency analysis technique 272, the matched coalescence technique 274) to eliminate false positives contained within the potential matches identified during the comparison step (210) of FIG. 2 to determine a set of matches for possible reporting to the user. Before the matches are reported to the user, however, the deep discovery system 100 may additionally apply traditional content matching methodologies. Such traditional content matching methodologies may involve an internalized comparison of file names, package names, project names, directory structures, and the like to determine whether each of the potential matches is internally consistent.

For example, after the application of one or more noise reduction techniques discussed above, a remaining pair of potential matches may include the Tomcat project and the Alfresco project. The matched portion of the Tomcat project may be associated with the directory structure "tomcat/org/apache/tomcat," while the matched portion of the Alfresco project may be associated with the directory structure "alfresco/src/thirdparties/org/apache/tomcat." In comparing the project names with the directory structures for internal consistency, the deep discovery system 100 determines that the directory structure for the Tomcat project indicates that the project is Tomcat, and therefore, the directory structure is consistent with the project name and the potential match in the Tomcat project is internally consistent. The directory structure for the Alfresco project, on the other hand, indicates that the project is Tomcat, and therefore, the potential match in the Alfresco project is internally inconsistent. Thus, the most probable match between the Tomcat and Alfresco projects is the Tomcat project.

Software as a Service ("SaaS")

Because deep discovery analysis can be both time and resource intensive, certain techniques may be used to leverage previous deep discovery analyses results. For instance, a typical deep discovery analysis may involve searching 200,000 files and identifying millions of potential matches over a period of hours or even days. Once this comparison process (210) is complete, a number of noise reduction techniques, discussed above, may be applied to eliminate false positives (e.g., redundant matches, incorrect matches) and reduce the potential matches to a set of confirmed matches that represent the "real" or "right" matches (212).

A first SaaS technique (282) allows the deep discovery system 100 to leverage the institutional knowledge gained from continuously matching many different items of user content against a common library of comparison content contained within the comparison content database 114. In this regard, the deep discovery system 100 may record and store the decisions and selections that are made either by the user or by the system 100 during each consecutive deep discovery analysis. Moreover, the deep discovery system 100 may continuously synthesize these retained decisions to provide a feedback loop as a software service to aid subsequent deep discovery analyses. For example, when applying one or more of the noise reduction techniques (212), the system 100 may apply the synthesized feedback information to advise a user faced with a set of potential matches as to the best match, thereby allowing the user to more quickly arrive at a set of positively identified confirmed matches without having to repetitively perform matching and noise reduction tasks that have been completed many times in the past. For instance, the system 110 may advise a user presented with a set of potential matches including Projects A-J that nine out of ten other users faced with an identical set of potential matches have selected Project C as the most probable match.

A second SaaS technique (283) allows the deep discovery system 100 to altogether avoid analyzing user content that has been analyzed in the past. Specifically, the deep discovery system 100 may perform a high-level comparison between one or more items of user content that have previously undergone a deep discovery analysis (the "first items of user content") and one or more items of user content to be analyzed (the "second items of user content"). This high-level comparison may involve comparing the directory trees of the first and second items of user content and, from this comparison, determining whether the first items of user content and the second items of user content are entirely identical or duplicate, entirely divergent, or whether they contain both common elements and different elements (a "content delta"). If a content delta does exist, then the system 100 may perform the deep discovery analysis discussed above only with respect to the content delta, or with respect to the different and/or new elements contained within the second item of user content, thereby leveraging the work previously performed with respect to the common elements contained in both the first and second items of user content and saving considerable analysis time.

Because the deep discovery system 100 may also retain the manual and/or automated decisions made in applying the noise reduction techniques, discussed above, with respect to the previous analysis of the first items of user content, the system 100 may automatically apply those decisions to the common elements presented in the second items of user content or, optionally and alternatively, the system 100 may present those previous decisions to the user for manual application as the user deems appropriate.

Notably, while the first and second items of user content may be submitted by the same user, such as a user that has revised certain items of user content and now wants to perform another deep discovery analysis to update the previous match results, the first and second items of user content need not involve the same items of user content nor be developed and/or submitted by the same user. As a result, the high-level comparison of the second SaaS technique 283 may be used by a single user or by multiple users across numerous organizational entities to anonymously harness deep discovery analyses efforts that have previously been performed with respect to common elements of items of user content, regardless of where and when those items of user content were developed and submitted to the system 100 for analysis.

In addition, because the deep discovery system 100 understands the interrelationships and interdependencies between the items of comparison content (e.g., between various open source projects or proprietary applications), the system 100 can automatically apply its institutional knowledge to reduce the analysis time associated with any deep discovery analysis. For instance, looking to the Alfresco example discussed above with respect to the "discovery on discovery" noise reduction technique (286), if an analysis of certain items of user content reveals the presence of a directory tree entitled "thirdparties," the system 100 may automatically recognize that the entirety of the Tomcat project is bundled within that directory such that there is no need to separately scan and perform matching with respect to the 10,000 files included in the Tomcat project within that directory. Instead, institutional knowledge relating to the composition of the Tomcat project may automatically be provided in the match results.

E. Reporting the Match Results

Returning to FIG. 2, the deep discovery protocol 200 may continue with reporting the match results to the user (214). While the system 100 may report the results after one or more noise reduction techniques have been applied to eliminate false positives from the potential matches (212), the deep discovery system 100 may also make current match results available to the user at any appropriate intermediate stage of the deep discovery protocol 200, allowing the user to assess the results as they are refined through the noise reduction process (212).

In one embodiment, the user may interface with the content exchange 104 to view the match results via a web browser at the node 101. Generally, the match results detail a number of items of protectable content that combine to form the item of user content, and the match results may include one or more positively identified confirmed matches as well as any remaining potential matches, which the user may elect to confirm upon review.

In further detail, the match results may provide any appropriate information relating to the confirmed and/or potential matches presented. For example, the results may identify one or more software packages that are included in the item of user content. In association with each software package, the match results detail whether the package is supported and/or certified and may identify a number of files, file sizes, creation dates, versions, directory tree structures, software models, applicable license types, terms, restrictions, and/or obligations, and associated use obligations. The match results may also provide information regarding any conflicts between the license terms and/or use obligations that apply to the item of user content and any conflicts between the license terms and/or use obligations that apply to the item of user content and the user's software use policy.

Figure 10:
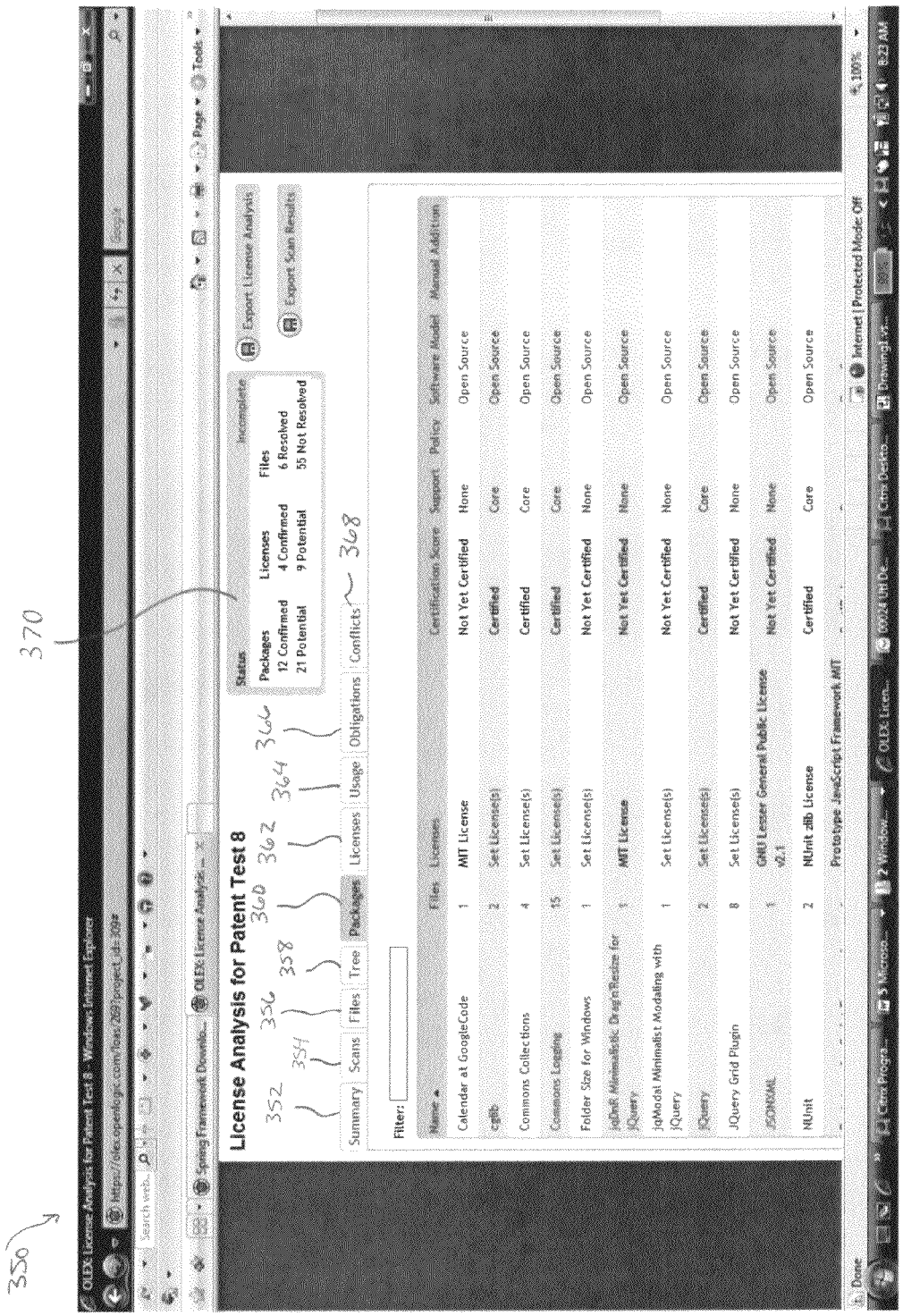
FIG. 10 is a screenshot illustrating one embodiment of a web-based user interface for presenting a set of content matching results, wherein a packages tab of the interface is active.

FIG. 10 illustrates one embodiment of a web-based user interface 350 for presenting the match results. While the described embodiment of interface 350 is presented to generally convey the manner and type of information that a user may garner from the deep discovery system 100, it should be understood that the system 100 may present any appropriate and/or available information relating to the match results in any appropriate structure and/or format. In this implementation, the interface 350 features several tabs 352-368, each presenting a different subset of information relating to the match results. The interface 350 also includes a status indicator 370 that provides a general overview of the current status of the deep discovery analysis. For instance, with respect to an exemplary analyses of an item of user content, the status indicator 370 shows that the deep discovery system 100 has identified a total of thirty-three software packages that have matched against sixty-one user files. Twelve of the software packages are confirmed and twenty-one of the software packages remain potential matches. The status indicator 370 also shows that the system 100 has confirmed four different license types that apply to the item of user content and identified nine additional license types that potentially apply to the item of user content.

FIG. 10 shows the "packages" tab 360 of the interface 350. The packages tab 360 provides a listing of the matching packages that have been identified from among the items of comparison content and provides several items of information regarding each package. That is, for each matching package, the tab 350 provides a number of user files that match the package, the license types that apply to the package, a certification score for the package, whether the package is supported, whether a user policy impacts the package, and an applicable software module.

Figure 11:
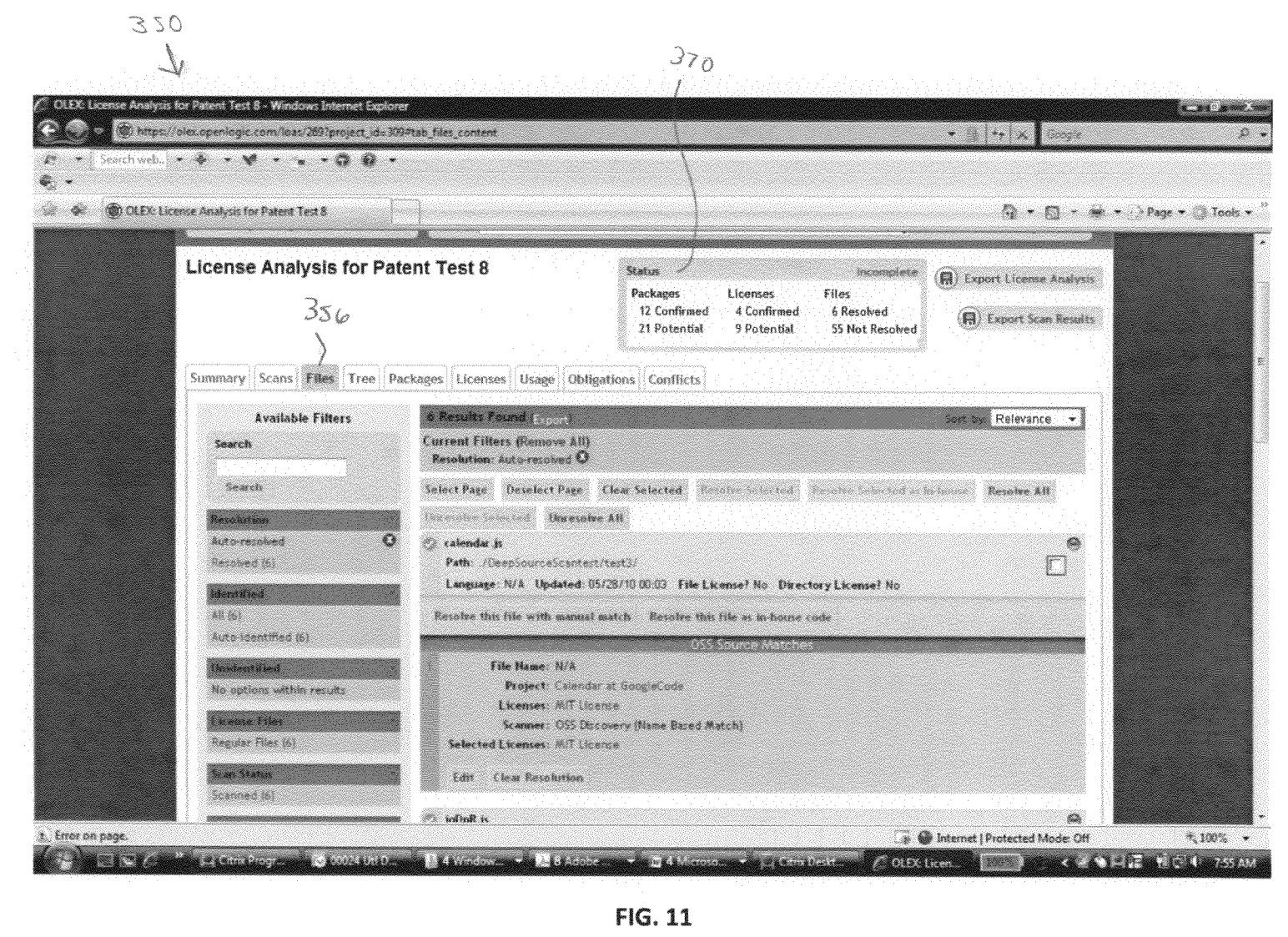

FIG. 11 illustrates the "files" tab 356. The files tab 356 provides additional details relating to the user files that match each identified package, or in other words, the user files that include a portion that is similar to a matched portion of the identified matching package. For example, the packages tab 360 identifies a package named Calendar at GoogleCode and states that one user file from the item of user content has matched against the Calendar at GoogleCode package. The files tab 356 provides further information about that file, including the file name, "calendar.js", and the local directory structure "./DeepSourceScantest/test3/".

Figure 12:
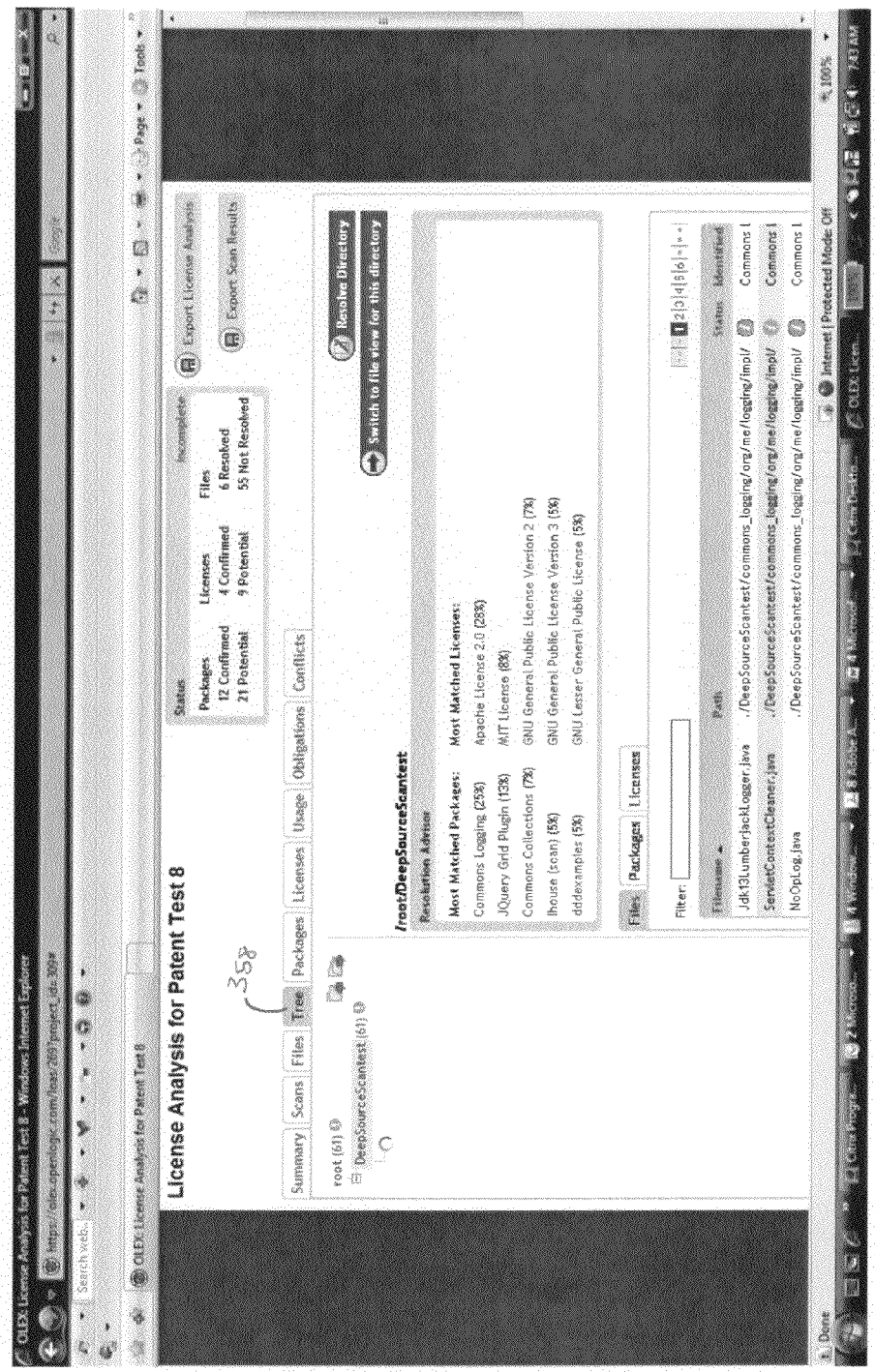
FIG. 12 is another screenshot illustrating the web-based user interface of FIG. 10, wherein a directory tree tab of the interface is active.

FIG. 12 illustrates the "tree" tab 358, which provides information relating to the directory structures or paths associated with each of the sixty-one files contained in the item of user content. The tree tab 358 also provides statistical information regarding which packages and licenses are most commonly matched. This information may assist the user in confirming one or more of the remaining potential matches and/or determining which license(s) applies to each of the matching packages.

Figure 13:
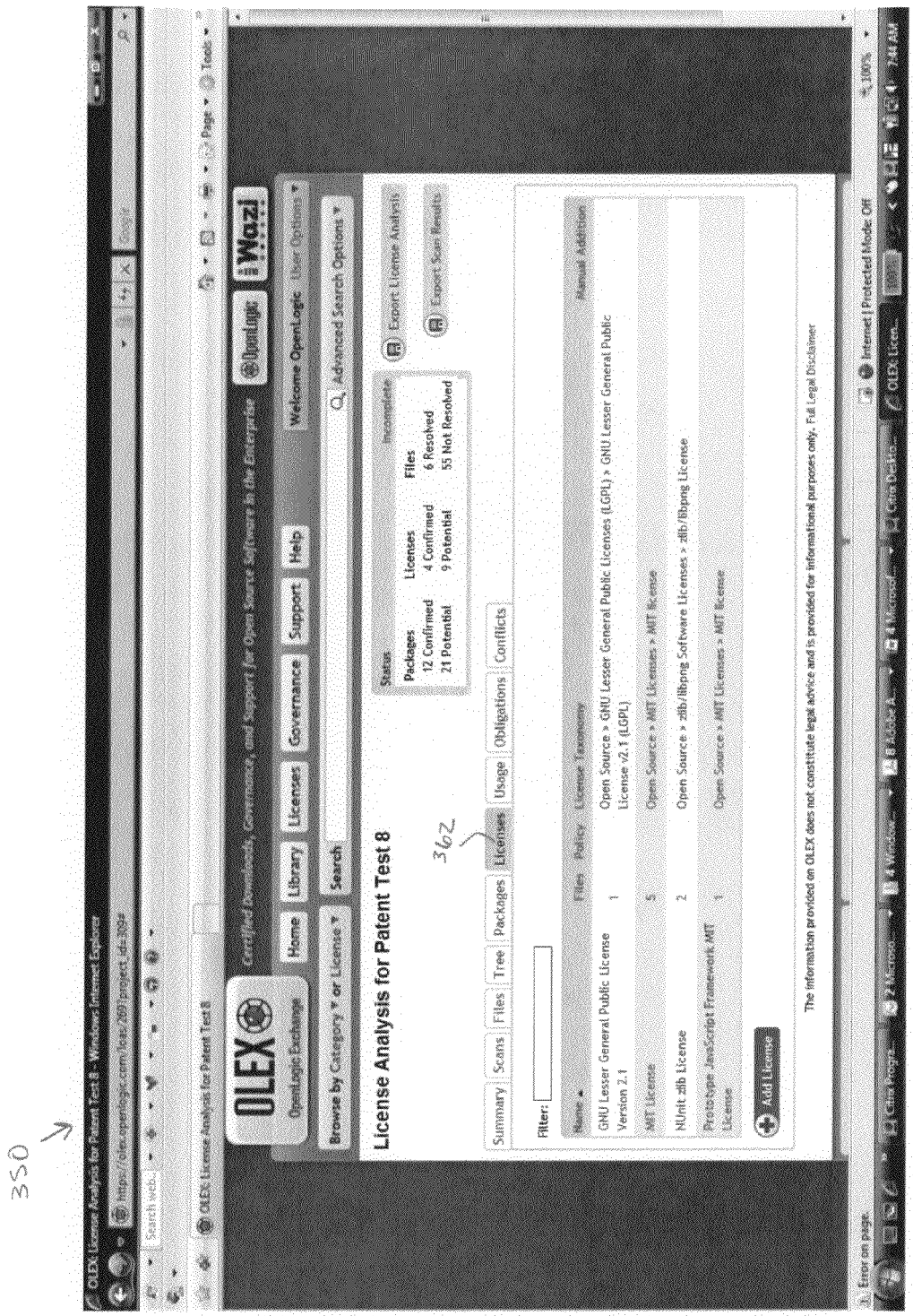
FIG. 13 is another screenshot illustrating the web-based user interface of FIG. 10, wherein a licenses tab of the interface is active.

FIG. 13 shows the "licenses" tab 362. The licenses tab 362 provides details relating to the licenses that apply to the item of user content as well as the particular user files that are subject to each license and the license taxonomy of each license. In this example, the GNU Lesser General Public License (the "GNU License"), MIT License, NUnit zlib License, and Prototype JavaScript Framework MIT License have each been confirmed as applying to the item of user content. In addition, if the user has submitted a software use policy, then the licenses tab 362 may include information addressing how the user files are classified with respect to that policy (e.g., in compliance, noncompliant, compliant if certain use obligations are met).

Figure 14:
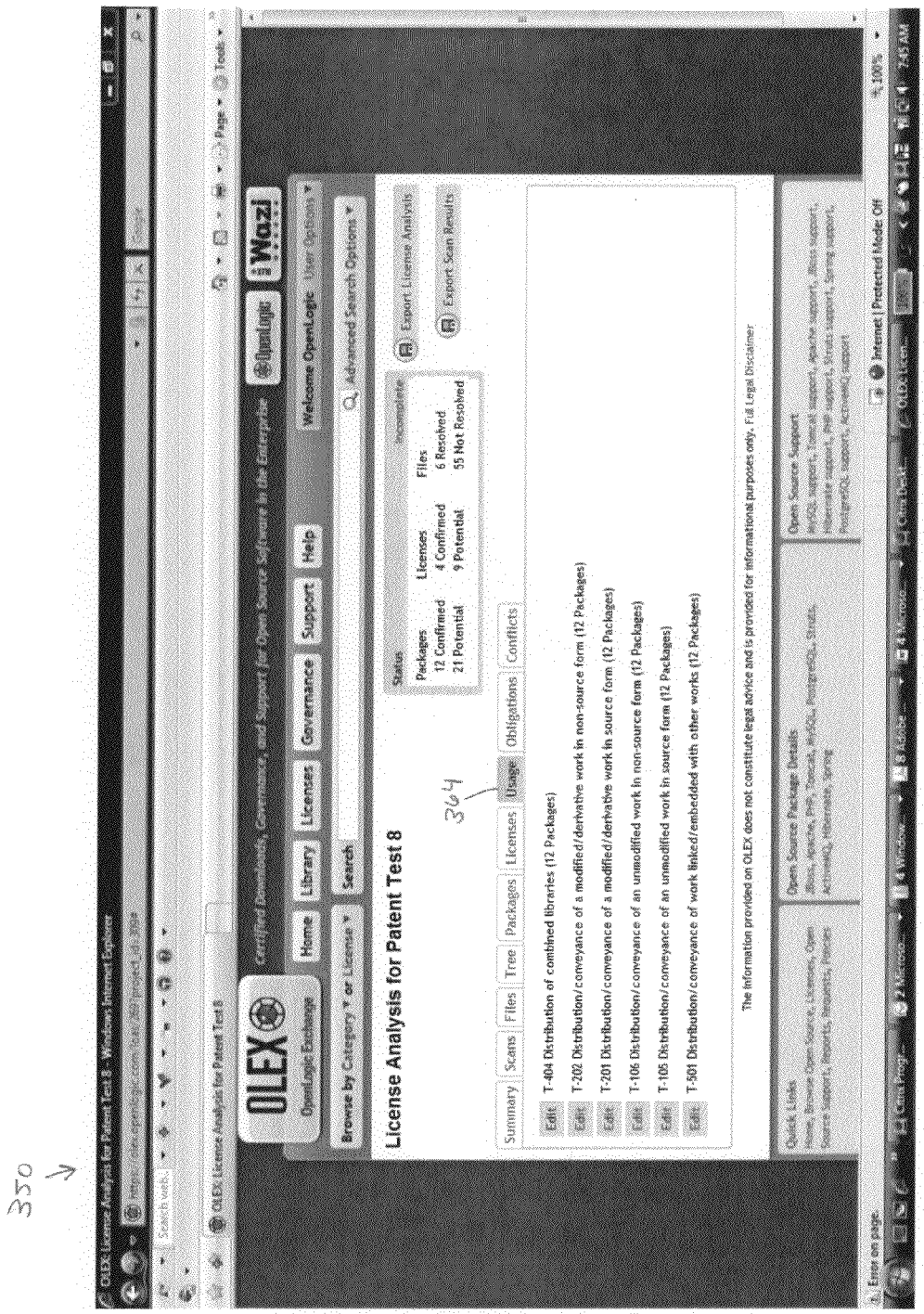
FIG. 14 is another screenshot illustrating the web-based user interface of FIG. 10, wherein a usage tab of the interface is active.
Figure 15:
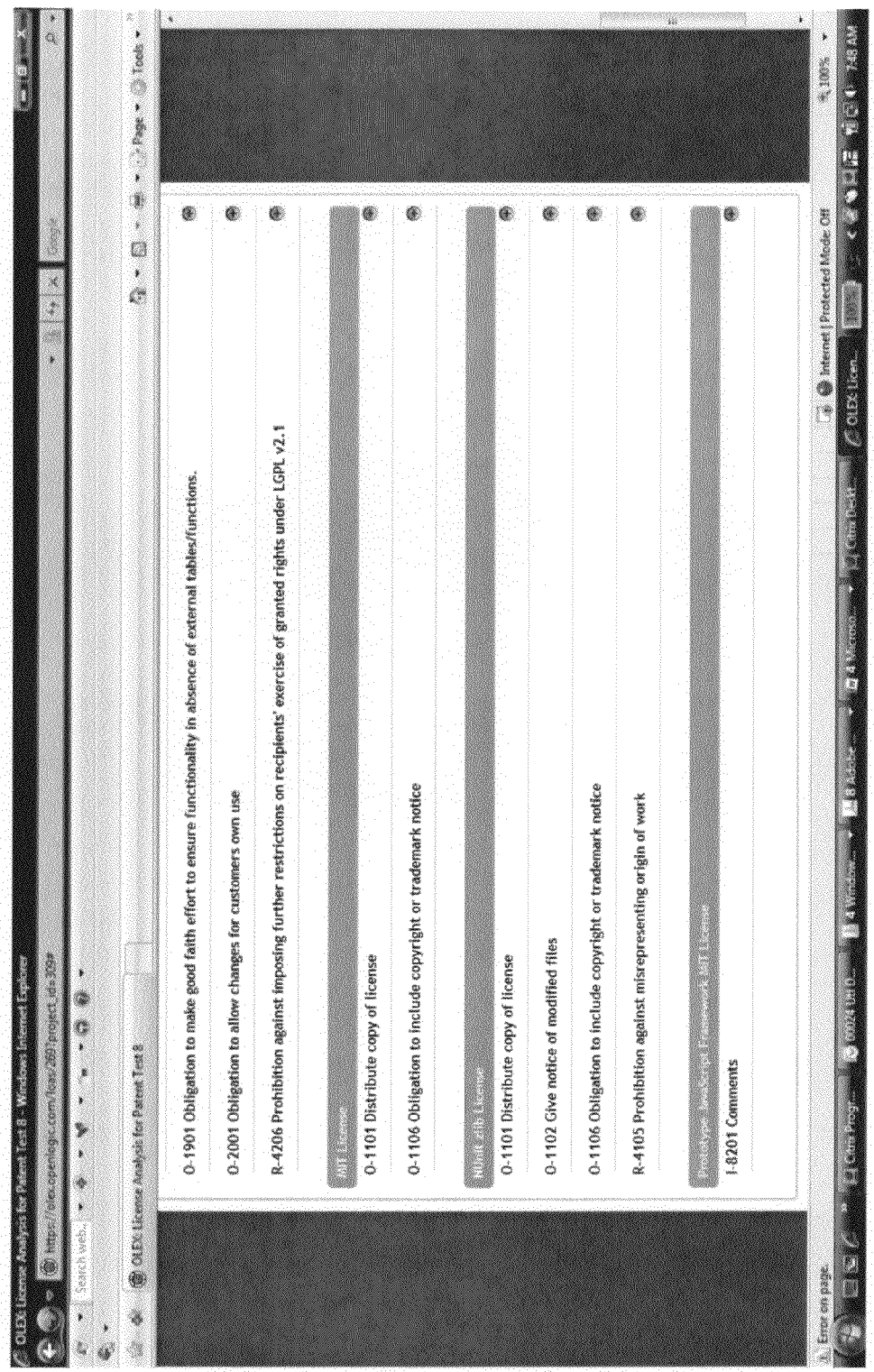
FIG. 15 is another screenshot illustrating the web-based user interface of FIG. 10, wherein an obligations tab of the interface is active.
Figure 16:
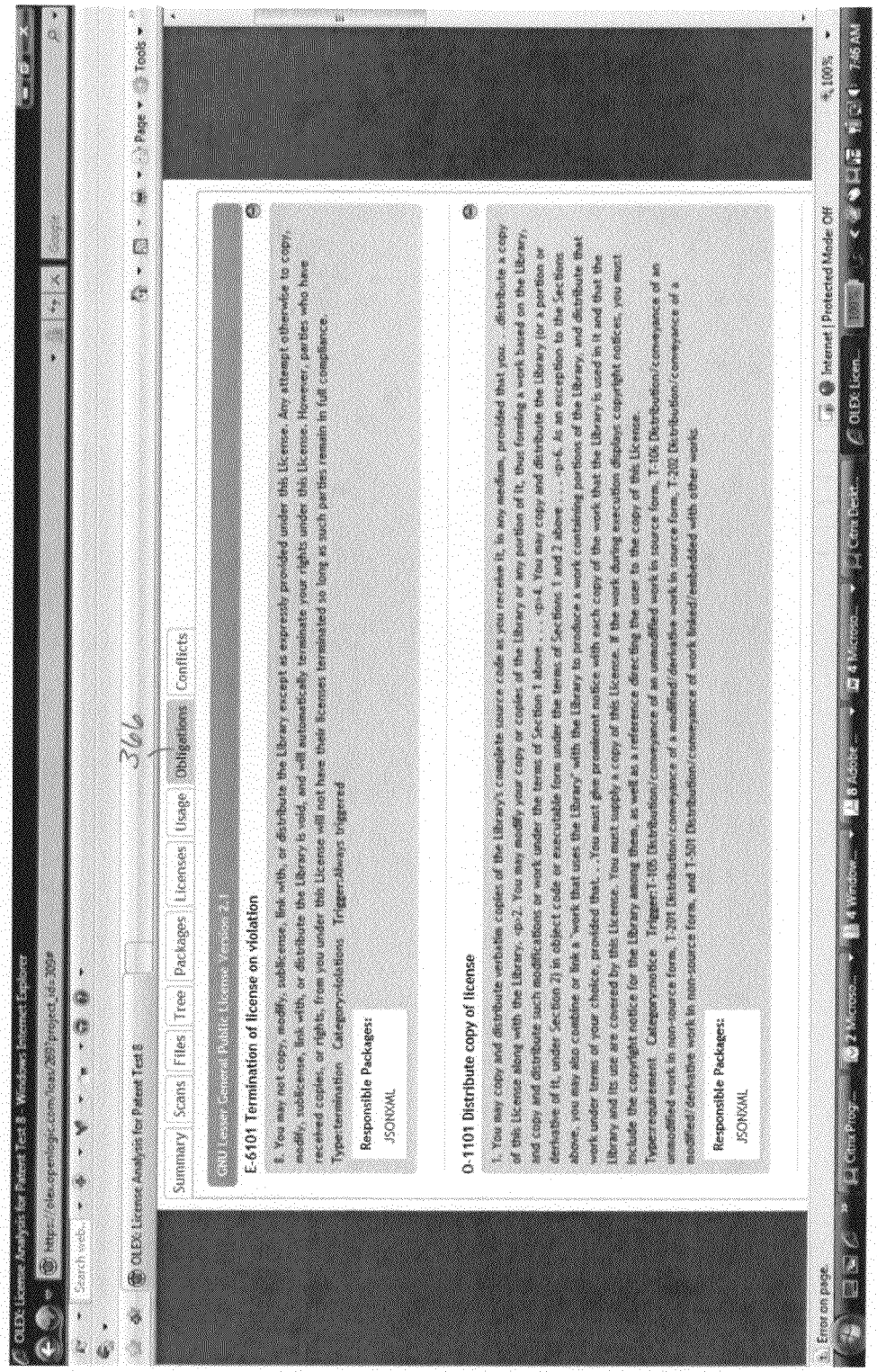
FIG. 16 is another screenshot illustrating the web-based user interface of FIG. 10, wherein a details portion of the obligations tab of FIG. 15 is active.

FIGS. 14-16 illustrate the "usage" and "obligations" tabs 364, 366, both of which detail the use obligations that apply to the item of user content given the applicable licenses. More specifically the usage tab 364, shown in FIG. 14, is organized according to usage category (e.g., distribution, modification, conveyance), while the obligations tab 366, shown in FIGS. 15-16, is organized according to applicable license type and provides information relating to the use obligations and/or restrictions that apply to the item of user content as a result being subject to each separate applicable license. For example, because the item of user content is subject to the GNU License, the item of user content is subject to the "termination of license on violation" term of the GNU License. Thus, the user may not copy, modify, sublicense, link with, or distribute the item of user content except as expressly provided under the GNU License, and any attempt to do so will terminate the user's rights under the GNU License.

Figure 17:
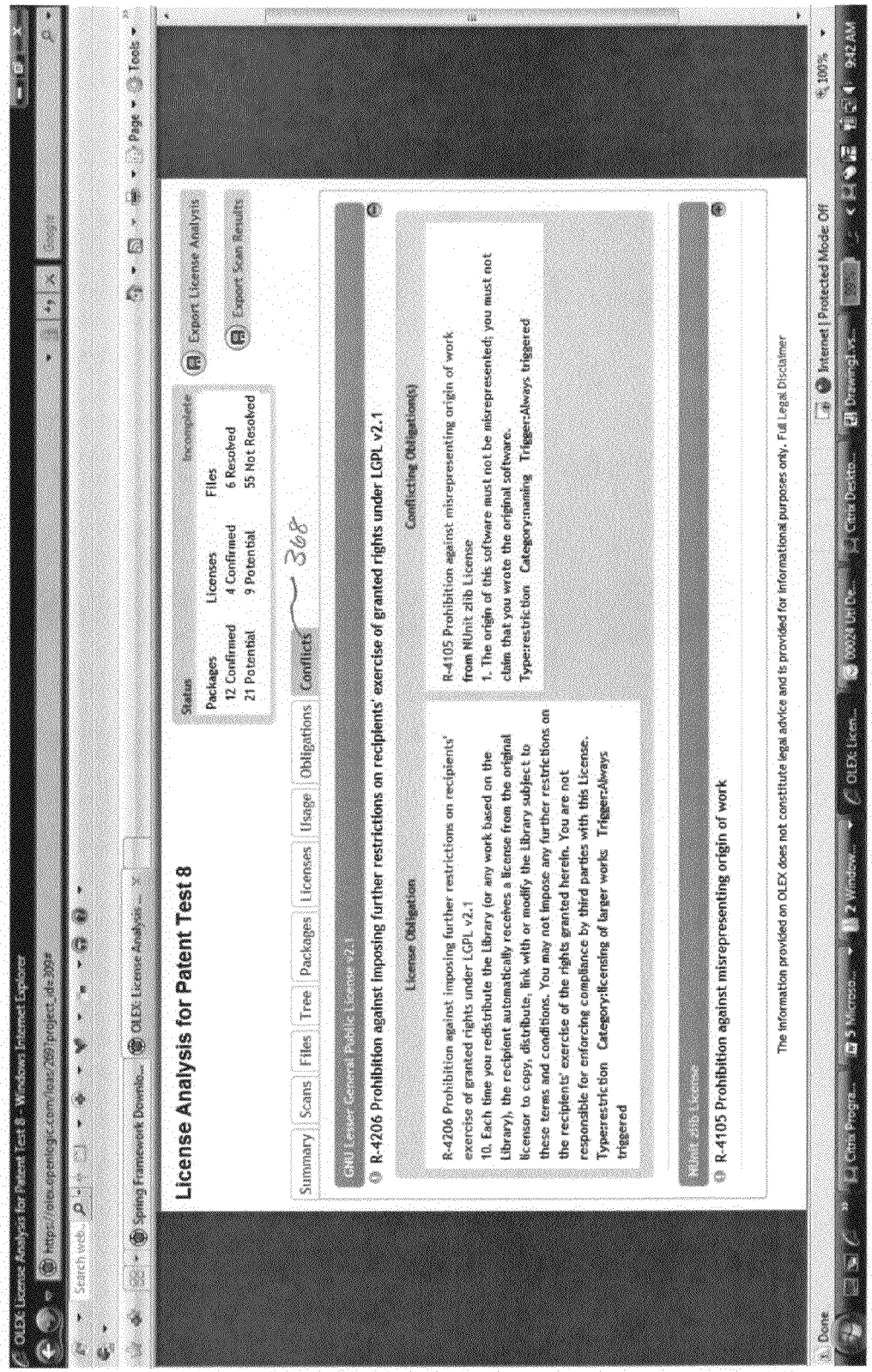
FIG. 17 is another screenshot illustrating the web-based user interface of FIG. 10, wherein a conflicts tab of the interface is active.

FIG. 17 details the "conflicts" tab 368, which identifies conflicts that exist between applicable licenses and their associated use obligations. For example, FIG. 17 shows that the conflicts tab 368 informs the user that the "prohibition against imposing further restrictions on recipients' exercise of granted rights" restriction of the GNU License conflicts with the "prohibition against misrepresenting origin of work" restriction of the NUnit zlib License. As a result, the user may address the conflict as necessary and/or appropriate prior to commencing use of the item of user content.

While the discussion above involves match results from only the deep discovery system 100, the system is able to import and merge match results from multiple deep discovery systems, including third-party systems, to allow the user to review and assess the results in an aggregated manner through a common interface (e.g., the interface 350 at the client node 101). In this regard, the user may treat all of the match results similarly without differentiating between third-party deep discovery methodologies. Moreover, the system 100 may receive items of user content for analysis from multiple third-party scanners. For example, the content exchange 104 may receive items of user content from the user nodes 101 and scanners 112 located behind firewall 102 or from the separately owned and operated user node 103 and scanner 113.

While the embodiments of the invention have been illustrated and described in detail in the drawings and foregoing description, such illustration and description is to be considered as exemplary and not restrictive in character. For example, certain embodiments described above may be combinable with other described embodiments and/or arranged in other ways. Accordingly, it should be understood that only example embodiments and variants thereof have been shown and described.

What is claimed:

1. A method for use in analyzing protectable content, comprising:
    storing, in a memory structure, a plurality of items of comparison content in a first format and a second format;
    receiving, from a user at a computer-based content exchange, an item of user content in said first format, at least one of said plurality of items of comparison content and said item of user content including open source content;
    converting said item of user content from said first format to said second format, wherein said converting comprises abstracting one or more interchangeable elements of said item of user content, and wherein said interchangeable elements combine to comprise less than an entirety of said item of user content, said interchangeable elements indicative of a non-functional element associated with said item of user content;
    comparing, using said computer-based content exchange, said item of user content in said second format to said items of comparison content in said second format; and
    in response to said comparing, determining that said item of user content and at least one of said items of comparison content each include a substantially similar portion.

2. A method as set forth in claim 1, wherein each of said plurality of items of comparison content and said item of user content comprise open source or proprietary content and are formed of one or more portions of source code, one or more portions of binary code, one or more source code files or binary code files, one or more directory structures, software projects, software applications, or software packages.

3. A method as set forth in claim 1, wherein said converting step comprises applying a one-way hashing function to said item of user content in said first format.

4. A method as set forth in claim 1, wherein said first format comprises code text and said second format comprises one or more hashed signatures associated with said code text.

5. A method as set forth in claim 1, wherein said interchangeable elements include one or more of variable names, comments, new line characters, line ending characters, spaces, and tabs.

6. A method as set forth in claim 1, wherein said abstracting comprises removing said interchangeable elements.

7. A method as set forth in claim 1, wherein said abstracting comprises replacing each said interchangeable element with a generic element.

8. A method as set forth in claim 7, wherein said generic element is a wildcard.

9. A method as set forth in claim 1, wherein said first format for said item of user content is incompatible with said first format for one or more of said items of comparison content.

10. A method as set forth in claim 9, wherein said item of user content in said first format exists in a first file type and said one or more of said items of comparison content in said first format exist in a second file type.

11. A method as set forth in claim 1, wherein said converting step comprises dividing said item of user content into portions prior to said abstracting step.

12. A method as set forth in claim 11, wherein each said portion comprises a file, a block of content within said file, or a bundle of files.

13. A method as set forth in claim 12, wherein said block of content comprises a defined number of lines of code or a defined number of code characters.

14. A method as set forth in claim 1, further comprising:
    using metadata associated with said item of user content and said items of comparison content, operating said computer-based content exchange for:
        locating said substantially similar portion within said first format of said item of user content and said first format of at least one of said items of comparison content; and
        comparing said substantially similar portion within said item of user content to said substantially similar portion within said at least one of said items of comparison content.

15. A method as set forth in claim 14, wherein said comparing said substantially similar portions comprises comparing code text.

16. A method as set forth in claim 15, wherein said comparing said substantially similar portions occurs on a private network maintained behind a firewall associated with said user.

17. A system for analyzing user content, comprising:
- a memory structure for storing a plurality of items of comparison content and one or more comparison signatures corresponding to each said item of comparison content, said one or more comparison signatures having previously been abstracted of one or more interchangeable elements of at least one of said plurality of items of comparison content;
- a scanner for receiving an item of user content from a user and creating one or more user signatures associated with said item of user content, wherein each said user signature abstracts one or more interchangeable elements of said item of user content, said one or more interchangeable elements indicative of a non-functional element associated with said item of user content; and
- a processor for comparing said user signatures to said comparison signatures and determining whether at least one of said items of comparison content includes a matched potion that is similar to a portion of said item of user content.

18. A system as set forth in claim 17, wherein each said item of comparison content and said item of user content comprise open source or proprietary software and include portions of source code, portions of binary code, source code files, binary code files, directory structures, directory trees, software projects, software applications, or software packages.

19. A system as set forth in claim 17, wherein each said comparison signature and each said user signature comprises a hash value.

20. A system as set forth in claim 17, wherein said interchangeable elements include variable names, comments, new line characters, line ending characters, spaces, and tabs.

21. A system as set forth in claim 17, wherein said scanner removes said interchangeable elements.

22. A system as set forth in claim 17, wherein said scanner replaces each said interchangeable element with a generic element.

23. A system as set forth in claim 22, wherein said generic element is a wildcard.

24. A system as set forth in claim 17, wherein said comparison signatures and said user signatures are created from different file types.

25. A system as set forth in claim 17, wherein each said user signature represents a portion of said item of user content.

26. A system as set forth in claim 25, wherein each said portion comprises a file, a block of content within said file, or a bundle of files, and wherein said block of content comprises a defined number of lines of code or a defined number of code characters.

27. A system as set forth in claim 17, further comprising an interface structure for outputting an identification of said items of comparison content that include said matched portion.

28. A system as set forth in claim 17, wherein said scanner resides on a private network behind a firewall.

29. A system as set forth in claim 28, wherein said processor uses metadata associated with said comparison signatures to locate said matched portion within said item of comparison content and metadata associated with said user signatures to locate said portion within said item of user content, allowing said matched portion of said item of comparison content and said portion of said item of user content to be loaded for direct comparison by said user.

30. A system as set forth in 29, wherein said item of user content remains behind said firewall, and wherein said portion of said item of user content is loaded for said direct comparison behind said firewall.

31. A system as set forth in claim 29, wherein said direct comparison comprises comparing code text of said portion of said item of user content directly against code text of said matched portion of said item of comparison content.

32. A method of analyzing user content, comprising:
- storing, in a memory structure, a plurality of comparison signatures, wherein each said comparison signature is associated with an item of comparison content, at least one of said, plurality of comparison signatures having previously been abstracted of one or more interchangeable elements of said item of comparison content;
- receiving, at a scanner located at a user node, an item of user content;
- dividing said item of user content into one or more portions;
- creating, using said scanner, a user signature associated with each said portion, wherein each said user signature abstracts one or more interchangeable elements of said portion;
- comparing, using a computer-based content exchange, said user signatures to said comparison signatures; and
- from said comparing, determining which of said items of comparison content include a matched portion that is similar to one of said portions of said item of user content.

* * * * *